United States Patent
Lee

(10) Patent No.: US 10,979,638 B2
(45) Date of Patent: Apr. 13, 2021

(54) ELECTRONIC DEVICE AND METHOD OF AUTOMATICALLY SWITCHING TO PANORAMA CAPTURE MODE

(71) Applicant: Samsung Electronics Co., Ltd., Gyeonggi-do (KR)

(72) Inventor: Hwajun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/417,820

(22) Filed: May 21, 2019

(65) Prior Publication Data

US 2019/0356853 A1    Nov. 21, 2019

(30) Foreign Application Priority Data

May 21, 2018    (KR) .......................... 10-2018-0057657

(51) Int. Cl.
  *H04N 5/225*    (2006.01)
  *H04N 5/232*    (2006.01)
  *G03B 17/56*    (2021.01)

(52) U.S. Cl.
  CPC ......... *H04N 5/23245* (2013.01); *G03B 17/56* (2013.01); *H04N 5/23238* (2013.01); *H04N 5/232935* (2018.08)

(58) Field of Classification Search
  CPC ................................................. H04N 5/23238
  See application file for complete search history.

(56) References Cited

U.S. PATENT DOCUMENTS

| 8,767,038 B2 | 7/2014 | Miyamoto et al. |
| 2010/0194852 A1* | 8/2010 | Tseng ................. H04N 5/23293 348/36 |
| 2011/0181688 A1 | 7/2011 | Miyamoto et al. |
| 2012/0069141 A1* | 3/2012 | Sim .................... H04N 5/23232 348/36 |
| 2015/0035941 A1* | 2/2015 | Chen ...................... G06F 3/017 348/36 |
| 2015/0103002 A1 | 4/2015 | Yoon et al. |
| 2016/0344930 A1* | 11/2016 | Chaaraoui .............. G03B 27/00 |

(Continued)

FOREIGN PATENT DOCUMENTS

| DE | 10 2015 121 084 A1 | 12/2015 |
| EP | 2 860 954 A1 | 4/2015 |

(Continued)

OTHER PUBLICATIONS

European Search Report dated Sep. 10, 2019.

*Primary Examiner* — Twyler L Haskins
*Assistant Examiner* — Dwight Alex C Tejano
(74) *Attorney, Agent, or Firm* — Cha & Reiter, LLC.

(57) ABSTRACT

An electronic device and method are disclosed herein. The electronic device includes a display, a camera, a sensor circuit, a processor. The processor implements the method, including executing a preview mode and outputting a camera preview image, detecting movement of the device, detecting whether a movement distance reaches a reference distance, when the movement distance reaches the reference distance, detecting whether the movement direction matches a reference direction, and when the movement direction matches the reference direction, switching to a panorama capture mode.

18 Claims, 22 Drawing Sheets

(56) References Cited

U.S. PATENT DOCUMENTS

2016/0353012 A1 12/2016 Kao et al.
2018/0107360 A1 4/2018 Kim et al.
2018/0183997 A1 6/2018 Chaaraoui et al.

FOREIGN PATENT DOCUMENTS

| EP | 3 310 035 A2 | 4/2018 |
| KR | 10-2017-0011321 A | 2/2017 |
| KR | 10-2017-0039633 A | 4/2017 |
| WO | 2010/132025 A1 | 11/2010 |
| WO | 2016/187412 A1 | 11/2016 |

\* cited by examiner

ELECTRONIC DEVICE AND METHOD OF AUTOMATICALLY SWITCHING TO PANORAMA CAPTURE MODE

CROSS-REFERENCE TO RELATED APPLICATION(S)

This application is based on and claims priority under 35 U.S.C. § 119 to Korean Patent Application No. 10-2018-0057657, filed on May 21, 2018, in the Korean Intellectual Property Office, the disclosure of which is incorporated by reference herein its entirety.

BACKGROUND

1. Technical Field

Embodiments of the disclosure relate to controlling cameras within electronic devices, and more particularly, to automatically switching.

2. Description of Related Art

Modern electronic devices, such as smartphones, tablet PCs, or the like are often equipped with a camera. Using a camera, the electronic device may capture images of objects situated within a field-of-view of the camera lens. For example, an angle of a camera's field-of-view may be a range (e.g., 30 to 50 degrees) narrower than the visible view range of a human being.

The electronic device may support a panorama capture mode. In the panorama capture mode, a plurality of images are photographed while the electronic device is moving (e.g., panning) and the photographed images are sequentially connected to reconstruct a single panoramic image. Accordingly, in the panorama capture mode, the electronic device may store several images in a memory and process the stored images to form one single panoramic image.

The above information is presented as background information only to assist with an understanding of the disclosure. No determination has been made, and no assertion is made, as to whether any of the above might be applicable as prior art with regard to the disclosure.

SUMMARY

An electronic device according to the related art has a complicated user interface for entering a panorama capture mode, so that the use thereof is infrequent.

Aspects of the disclosure are to address at least the above-mentioned problems and/or disadvantages and to provide at least the advantages described later below.

In accordance with an aspect of the disclosure, an electronic device is disclosed, including a display, a camera arranged on one surface of the electronic device, a sensor circuit configured to sense movement of the electronic device, a processor functionally coupled to the camera and the sensor circuit, and a memory electrically coupled to the processor, wherein the memory stores instructions that, when executed, cause the processor to: execute a preview mode including outputting an image obtained using the camera to the display, obtain movement information using the sensor circuit while executing the preview mode, determine whether a movement distance of the electronic device is equal to or greater than a prespecified reference distance, based on the movement information, when the movement distance is equal to or greater than the prespecified reference distance, determine whether a moving direction of the electronic device matches a prespecified reference direction, based on the movement information; and when the moving direction of the electronic device matches the prespecified reference direction, switch to a panorama capture mode.

In accordance with another aspect of the disclosure, a method of an electronic device is disclosed, including when detecting a movement of the electronic device, obtaining movement information using a sensor circuit while executing a preview mode, the preview mode including outputting an image obtained using a camera to a display, tracking a movement distance of the electronic device based on the movement information, when the movement distance of the electronic device is equal to or greater than a prespecified reference distance, determining whether a moving direction of the electronic device matches a prespecified reference direction during the movement based on the movement information, and when the moving direction of the electronic device matches the prespecified reference direction, switching to a panorama capture mode.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

In regard to the description of the drawings, the same or corresponding elements may be given the same reference numerals.

DETAILED DESCRIPTION

Figure 1:
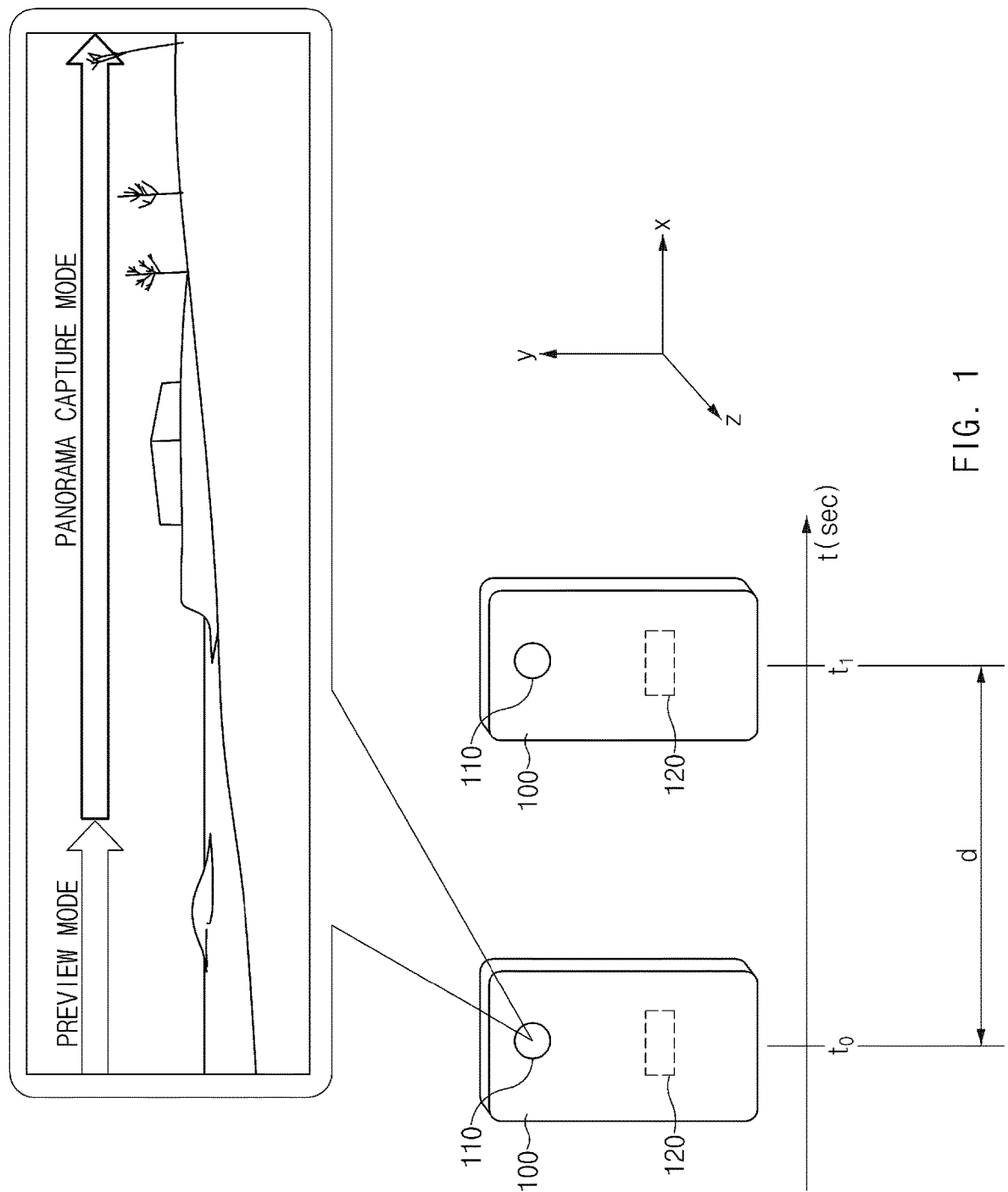
FIG. 1 is a view illustrating an automatic panorama capture mode of an electronic device according to an example embodiment.

Hereinafter, certain embodiments of the disclosure will be described with reference to accompanying drawings. However, those of ordinary skill in the art will recognize that modification, equivalent, and/or alternative on certain embodiments described herein can be variously made without departing from the disclosure.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1 is a view illustrating an automatic panorama capture mode of an electronic device according to an embodiment. An aspect of the disclosure is to provide an electronic device capable of automatically switching from a preview mode to a panorama capture mode based on the movement of the electronic device, and a method of automatically switching to a panorama capture mode.

Referring to FIG. 1, an electronic device 100 may include a camera 110 and a sensor circuit (or a sensor device) 120.

According to an embodiment, the camera 110 may be arranged on one surface (e.g., a front or rear surface) of the electronic device 100. According to an embodiment, the one surface of the electronic device 100 may include a display. According to another embodiment, the one surface may lack a display.

The camera 110 may be configured to capture a still or moving image. The camera 110 may include one or more lens assemblies, an image sensor, an image signal processor, or a lens driving unit. The lens assembly may have a specified angle of view and a specified focal length. Depending on an attribute of the lens assembly, the image obtained from the camera 110 may be an image that is focused within the field of view (FOV). The image sensor may convert the light transmitted from an external object through the lens assembly into an electrical signal to obtain image data corresponding to the external object (e.g., a subject). The image sensor may be implemented as a charged coupled device (CCD) sensor or a complementary metal oxide semiconductor (CMOS) sensor. The lens driving unit may adjust the position of the lens assembly in response to an instruction of a processor (e.g., an image signal processor).

According to an embodiment, the sensor circuit 120 may sense a movement of the electronic device 100 and output movement information corresponding to the sensed movement. For example, the sensor circuit 120 may include at least one of a gyro sensor, a geomagnetic sensor, or an acceleration sensor.

According to an embodiment, the electronic device 100 (e.g., a processor) may obtain movement information by using the sensor circuit 120 in a preview mode and may determine, based on the movement information, whether a movement distance 'd' of the electronic device 100 is greater than or equal to a specified reference distance (e.g., 5 cm). For example, the electronic device 100 may detect a distance by which the electronic device 100 is moved for a prespecified time (e.g., the time period from t0 to t1, e.g., 1 second) based on the movement information, and may determine whether the identified movement distance is greater than or equal to the specified reference distance.

When the movement distance of the electronic device 100 is equal to or greater than the specified reference distance, the electronic device 100 may determine whether a moving direction of the electronic device 100 is a prespecified reference direction. When the moving direction is the reference direction, the electronic device 100 may switch to a panorama capture mode.

According to certain embodiments, the reference direction may be, for example, an upward direction (a direction in which an upper side surface of the electronic device 100 faces (e.g., +y direction)), a downward direction (the direction in which a lower side surface of the electronic device 100 faces (e.g., −y direction)), a right direction (the direction in which a right side surface of the electronic device 100 faces (e.g., +x direction)), and a left direction (the direction in which a left side surface of the electronic device 100 faces (e.g., −x direction)) of the electronic device 100 at the time point t1 when the electronic device 100 moves by the specified reference distance.

The electronic device 100 may further identify at least one variable of an angle change of the electronic device 100, a moving velocity or a position change (e.g., changes in +y and −y directions) in a plurality of second directions perpendicular to a reference direction based on the movement information while moving by the specified reference distance, and may switch from the preview mode to the panorama capture mode further based on the at least one variable.

For example, when the movement distance of the electronic device 100 is equal to or greater than the specified reference distance and the moving direction of the electronic device 100 is the reference direction, the electronic device 100 may switch to the panorama capture mode.

As another example, the electronic device 100 may identify an angle change of the electronic device 100 while moving by a specified reference distance, and when the movement distance of the electronic device 100 is equal to or greater than the specified reference distance, the moving direction of the electronic device 100 is the reference direction, and the angle change is within a specified reference range, the electronic device 100 may switch to the panorama capture mode. For example, the electronic device 100 may use at least one of a gyro sensor or a geomagnetic sensor to identify the change in angle of the electronic device 100.

For another example, when the movement distance of the electronic device 100 is equal to or greater than the specified reference distance and the moving direction of the electronic device 100 is the reference direction, the position change of the electronic device 100 in the plurality of second directions may be identified during the movement by the specified reference distance. The electronic device 100 may switch from the preview mode to the panorama capture mode when the identified position change in the second direction is within a specified reference distance range. For example, the specified reference distance range may include distance ranges of half of specified reference distances different from each other in two directions perpendicular to the reference direction based on the position of the electronic device 100 at the time point t1 (or the time point t0).

The electronic device 100 may generate a panoramic image in the panorama capture mode based on the plurality of images obtained by using the camera 110. For example, the plurality of images may include first images obtained in the preview mode and second images obtained in the panorama capture mode. For example, the electronic device 100 may align the first and second images to allow the boundary portions between the first images and the boundary portions between the second images to overlap each other in a specified size, and may combine the first and second images through image processing such as stitching and blending, thereby generating a panoramic image.

According to the above-described embodiment, the electronic device 100 may switch automatically or through a user confirmation from the preview mode to the panorama capture mode corresponding to the movement of the electronic device without user's operation for entering the panorama capture mode. Thus, the convenience of entering the panorama capture mode may be improved.

Figure 2:
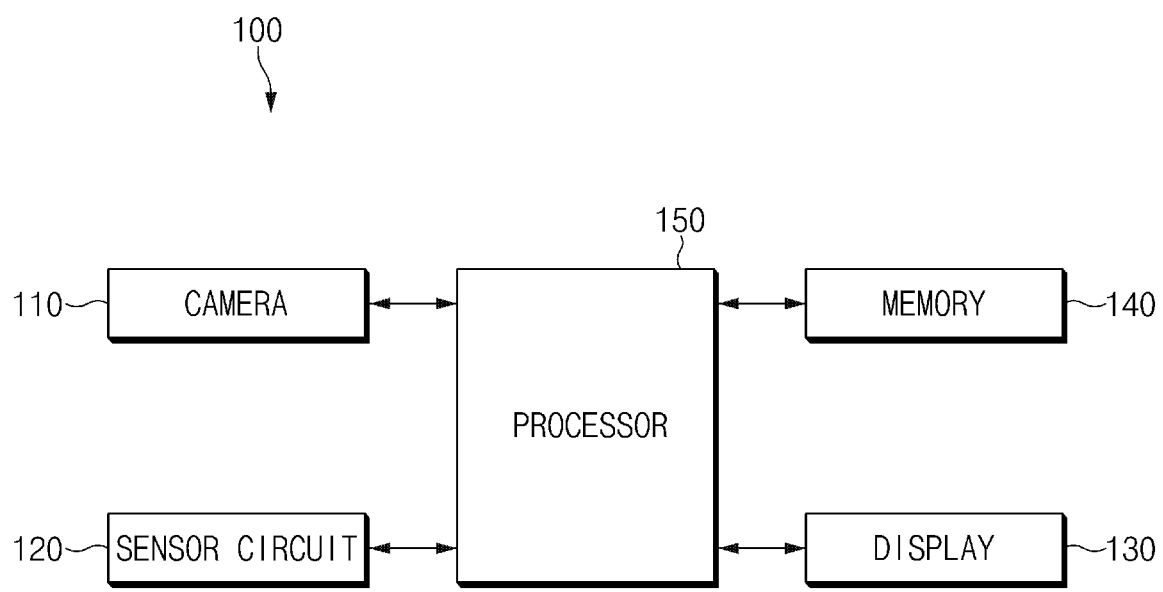
FIG. 2 is a block diagram of an electronic device according to an example embodiment.

FIG. 2 is a view illustrating a configuration of an electronic device according to an embodiment.

Referring to FIG. 2, the electronic device 100 (e.g., the electronic device 100 of FIG. 1) may include the camera 110 (e.g., the camera 110 of FIG. 1), the sensor circuit 120 (e.g., the sensor circuit 120 of FIG. 1), a display 130, a memory 140, and a processor 150. In an embodiment, some components may be omitted, or an additional component may be further included. In an embodiment, some of the components may be coupled to form a single entity, but the functions of the corresponding components before being coupled may be performed in the same manner.

According to an embodiment, the camera 110 may obtain (e.g., capture, photograph, etc.) a still or moving image in response to an instruction of the processor 150. For example, a camera 110 provided on a first surface (e.g., a rear surface) of the electronic device 100 may be used to capture an image.

According to an embodiment, the sensor circuit 120 may obtain movement information of the electronic device 100, corresponding to preset setting information or an instruction of the processor 150. For example, the movement information may include at least one of angular velocity information (or rotation information), geomagnetism information (or direction information), or acceleration information (or movement distance information) of the electronic device 100.

According to an embodiment, the display 130 may display for example, various visual content (e.g., text, an image, a video, an icon, a symbol, or the like). For example, the display 130 may include a liquid crystal display (LCD), a light emitting diode (LED) display, an organic light emitting diode (OLED) display, or an electronic paper display. The display 130 may output an image obtained from the camera 110 corresponding to an instruction of processor 150 or a setting. The display 130 may be provided on a second surface (e.g., a front surface) of the electronic device 100. For example, the display 130 may be a touch screen display including an input device. According to certain embodiments, in the electronic device 100 of the disclosure, the input device may be provided separately from the display 130.

For example, the memory 140 may store a command or data related to at least another component of the electronic device 100. The memory 140 may be a volatile memory (e.g., RAM, or the like), a non-volatile memory (e.g., a ROM, a flash memory, or the like), or the combination thereof. The memory 140 may store instructions that are set to allow the processor 150 to identify at least one of a movement distance of the electronic device 100, a moving direction of the electronic device 100, or an angle change of the electronic device 100 based on the movement information. The memory 140 may store instructions that are set to allow the processor 150 to identify the moving speed of the electronic device 100 based on the movement information. The memory 140 may store instructions set to switch from the preview mode to the panorama capture mode (e.g., a mode for panoramic photographing) in association with the function of the camera 110 when the movement of the electronic device meets a specified condition for a specified time or at a specific time point. The memory 140 may store instructions set to generate a panoramic image based on the plurality of images obtained by using the camera 110 in the panorama capture mode.

The processor 150 may execute operations or data processing related to control and/or communication of at least one other component of the electronic device 100 by using the instructions stored in the memory 140. For example, the processor 150 may include at least one of a central processing unit (CPU), a graphics processing unit (GPU), a microprocessor, an application processor, an application specific integrated circuit (ASIC), and field programmable gate arrays (FPGA), and may have a plurality of cores.

According to an embodiment, the processor 150 may output, to the display 130, an image (preview image) obtained by using the camera 110 in the preview mode. The processor 150 may obtain the movement information by using the sensor circuit 120 in the preview mode and may identify the movement of the electronic device 100 based on the movement information. For example, the processor 150 may use an acceleration sensor to identify at least one of a moving direction, a movement distance, or a moving speed of the electronic device 100. As another example, the processor 150 may use at least one of a gyro sensor or a geomagnetic sensor to identify an angle change (e.g., a change in rotation angle or rotation direction) of the electronic device 100.

The processor 150 may automatically switch to the panorama capture mode when the motion of the electronic device 100 meets the specified conditions. The specified conditions may relate to at least one of, for example, the movement distance of the electronic device 100, the moving direction, the moving speed, the angle change of the electronic device 100, or the object included in the preview image.

The processor 150 may automatically switch from the preview mode to the panorama capture mode even when the user enters a specific menu of the user interface and does not set the switch to the panorama capture mode. When the automatic switching function for the panorama capture mode is set, the processor 150 may automatically switch from the preview mode to the panorama mode based on the movement information of the electronic device 100.

For example, the panorama capture mode may be a mode in which the electronic device 100 processes a plurality of images photographed while one of the angle or position of the electronic device is changed and reconstructs the images into one image.

According to an embodiment, for example, the specified condition may include a condition that the movement distance of the electronic device 100 is greater than or equal to the specified reference distance, and the moving direction of the electronic device 100 is the reference direction. The processor 150 may track the movement distance of the electronic device 100 based on the movement information of the electronic device 100 in the preview mode. When the traced movement distance is greater than or equal to the specified reference distance, the processor 150 may determine whether the moving direction of the electronic device 100 moved by the specified movement distance is the reference direction. For example, the reference direction may include at least one of an upper side direction (e.g., a +y direction of FIG. 1), a lower side direction (e.g., a +y direction of FIG. 1), a left direction (e.g., a −x direction of FIG. 1), and a right direction (e.g., an x direction of FIG. 1) of the electronic device 100 at a time point (e.g., t1 of FIG. 1) when the electronic device 100 moves by the specified reference distance. When the movement distance of the electronic device 100 is equal to or greater than the specified reference distance and the moving direction of the electronic device 100 is the reference direction, the electronic device 100 may switch from the preview mode to the panorama mode.

According to an embodiment, for example, the specified condition may include a condition that the movement distance of the electronic device 100 is equal to or greater than the specified reference distance, the moving direction of the electronic device 100 is the reference direction, and the angle change of the electronic device 100 is within the specified reference range. The processor 150 may track the movement distance of the electronic device 100 based on the movement information of the electronic device 100 in the preview mode. When the traced movement distance is greater than or equal to the specified reference distance, the processor 150 may determine whether the moving direction of the electronic device 100 moved by the specified movement distance is the reference direction. When the movement distance of the electronic device 100 is equal to or greater than the specified reference distance and the moving direction of the electronic device 100 is the reference direction, the processor 150 may identify the angle change of the electronic device 100 while the electronic device 100 moves by the specified reference distance based on the movement information. For example, the angle change of the electronic device 100 may include an angle change of the electronic device 100 as the electronic device 100 is rotated about at least one of the xy axis direction, the yz axis direction, or the zx axis direction. When the movement distance of the electronic device 100 is equal to or greater than the specified reference distance, the moving direction of the electronic device 100 is the reference direction, and the angle change of the electronic device 100 is within the specified reference range, the processor 150 may automatically switch from the preview mode to the panorama capture mode (or switch through user confirmation).

For example, the specified reference range includes +10 degrees to −10 degrees with respect to the position of the electronic device 100 at the time point (e.g., t0 of FIG. 1) when the tracking for the specified reference distance starts. According to certain embodiments, the specified reference range may be set differently for the xy axis direction, the yz axis direction, and the xz axis direction. According to certain embodiments, the processor 150 may determine whether the electronic device 100 has been stopped for a specified time based on the movement information, and when the electronic device 100 has been stopped for the specified time, the electronic device 100 may start to track the movement distance thereof.

According to certain embodiments, the processor 150 may first identify the moving direction and angle change of the electronic device 100 based on the movement information of the electronic device 100, and then, the processor 150 may switch the electronic device 100 from the preview mode to the panorama capture mode as the result of identifying the movement distance of the electronic device 100. For example, when it is identified that the moving direction of the electronic device 100 is the reference direction, the processor 150 may determine whether the angle change of the electronic device 100 is within the specified reference range. When the angle change is within the specified reference range, the processor 150 may determine whether the movement distance of the electronic device 100 is equal to or greater than the specified reference distance. The processor 150 may switch from the preview mode to the panorama capture mode when the movement distance of the electronic device 100 is greater than or equal to the specified reference distance.

According to an embodiment, the specified condition may further include a condition of at least one of a moving speed in the reference direction or a movement distance in a second direction. For example, the processor 150 may further identify the moving speed of the electronic device 100 during movement by a specified reference distance based on the movement information. When the movement distance of the electronic device 100 is equal to or greater than the specified reference distance, the moving direction of the electronic device 100 is the reference direction, and the angle change of the electronic device 100 is within the specified reference range, the processor 150 may switch from the preview mode to the panorama capture mode when the moving speed of the electronic device 100 in the reference direction is less than a specified reference speed. As another example, the processor 150 may further identify the position changes in a plurality of second directions while being moved by the reference distance in the reference direction. When the movement distance of the electronic device 100 is greater than or equal to the specified reference distance and the angle change of the electronic device 100 is within the specified reference range while the moving direction of the electronic device 100 is the reference direction, the processor 150 may switch the preview mode to the panorama capture mode when the position changes in the plurality of second directions are within the specified reference distance range. For example, the second directions, which are perpendicular to the reference direction, may include the +y direction and the −y direction when the reference direction is the x-axis direction of FIG. 1.

According to an embodiment, the processor 150 may further identify an object included in first images obtained while being moved by the specified reference distance, and may switch to the panorama capture mode when identifying that a specified object is included in the first images. For example, the specified object may include an object related to a landscape such as horizon, sea, mountain, or the like. As another example, the specified object may be an object selected from a plurality of selectable objects provided by the processor 150 in response to a user input. In the above-described embodiment, when the movement distance is less than the specified reference distance, the moving direction is not the reference direction, the angle change of the electronic device 100 during the movement by the specified reference distance is out of the specified reference range, the moving speed of the electronic device 100 during the movement by the specified reference distance is equal to or greater than the specified reference speed, or the position change with respect to the plurality of second directions is out of the specified reference distance range, the processor 150 may maintain the preview mode.

According to an embodiment, the processor 150 may generate a panoramic image in the panorama capture mode based on the plurality of images obtained by using the camera 110. For example, the processor 150 may generate a panoramic image by aligning a plurality of images such that the boundary portions of the plurality of images are appropriately overlapped and combining the images through image processing such as stitching, blending, and the like. The plurality of images applied to the panoramic image may include images obtained in the panorama capture mode. According to certain embodiments, the plurality of images may include the first images obtained in the preview mode and the second images obtained in the panorama capture mode. To this end, the processor 150 may store, in the memory 140, the first images including at least some of the preview images in the preview mode while tracking the movement distance of the electronic device 100 in the preview mode, and may store, in the memory 140, the second images obtained in the panorama capture mode. The processor 150 may generate a panoramic image based on the first and second images stored in the memory 140 in the panorama capture mode. The processor 150 may delete the first images stored in the memory 140 in the preview mode when the movement of the electronic device 100 does not correspond to the specified condition and the electronic device 100 does not switch to the panorama capture mode.

According to an embodiment, the processor 150 may generate a panoramic image by selectively using some of the first images obtained prior to switching to the panorama capture mode. For example, the processor 150 may output, to the display 130, the screen information including an editing object that can specify some of the first images (some images to be used for generating the panoramic image) in the panorama capture mode. For example, the editing object may include a button for selecting, from all the first images, images which are to be used to generate the panoramic image and are obtained for a time (e.g., several seconds) before switching to the panorama capture mode. As another example, the editing object may include a menu for selecting, from the all the first images, some images which follow the second images and are used to generate the panoramic image.

According to an embodiment, the processor 150 may output screen information for guiding the switching to the panorama capture mode to the display 130 before switching to the panorama capture mode or when the switching mode is switched to the panorama capture mode. The screen information may include an editing object capable of selecting whether to switch to the panorama capture mode.

According to an embodiment, when the movement of the electronic device 100 meets a specified condition, the processor 150 may output, to the display 130, the screen information capable of selecting whether to switch to the panorama capture mode. The processor 150 may switch to the panorama capture mode or may maintain the preview mode in response to the input of the user corresponding to the screen information. For example, when the processor 150 identifies the user input that selects the switching to the panorama capture mode (or accepting the switching) through the switching button included in the screen information, the processor 150 may switch from the preview mode to the panorama capture mode. As another example, when the processor 150 identifies the user input that does not select switching to the panorama capture mode through the screen information, the processor 150 may maintain the preview mode without switching to the panorama capture mode. As still another example, when the movement of the electronic device 100 meets a specified condition, the processor 150 may display, to the display 130, the screen information guiding that the mode automatically switches to the panorama capture mode when the electronic device 100 is further moved by another specified reference distance in the reference direction. In this case, after outputting the screen information, the processor 150 may determine whether the electronic device 100 is further moved by another specified reference distance in the reference direction based on the movement information. When the electronic device 100 is further moved by another specified reference distance in the reference direction, the processor 150 may switch from the preview mode to the panorama capture mode.

According to the above-described embodiment, the processor 150 automatically switches from the preview mode to the panorama capture mode based on the movement of the electronic device 100, or outputs the screen information for switching to the panorama capture mode, so that it is possible to greatly improve the convenience of use and switching to the panorama capture mode.

According to an embodiment, an electronic device (e.g., the electronic device 100 of FIG. 2) may include a display (e.g., the display 130 of FIG. 2); a camera (e.g., the camera 110 of FIG. 2) arranged on one surface of the electronic device; a sensor circuit (e.g., the sensor circuit 120 of FIG.

2) capable of sensing movement of the electronic device; a processor (e.g., the processor 150 of FIG. 2) functionally connected to the camera and the sensor circuit; and a memory (e.g., the memory 140 of FIG. 2) electrically connected to the processor. The memory may store instructions which cause the processor to, in a preview mode in which images obtained by using the camera are output to the display, obtain movement information by using the sensor circuit, obtain a movement distance of the electronic device based on the movement information, determine whether a moving direction of the electronic device is a specified reference direction based on the movement information when the movement distance of the electronic device is equal to or greater than a specified reference distance, and switch to a panorama capture mode when the moving direction of the electronic device is the reference direction.

The reference direction may include at least one of a left direction, a right direction, an upward direction, and a downward direction of the electronic device moved by the specified reference distance.

The instructions may further cause the processor to identify an angle change of the electronic device during the movement by the specified reference distance based on the movement information, and switch from the preview mode to the panorama capture mode when the moving direction of the electronic device is the reference direction and the angle change is within a specified reference range.

The instructions may further cause the processor to identify at least one of an angle change in an xy axis direction, an angle change in an yz axis direction, or an angle change in a zx axis direction among specified xyz three-axis directions when the angle change of the electronic device is identified during the movement by the specified reference distance.

The instructions may further cause the processor to identify a moving speed of the electronic device while the electronic device is moved by the specified reference distance, based on the movement information, and switch to the panorama capture mode when the movement distance of the electronic device is greater than or equal to the specified reference distance, the moving direction of the electronic device is the reference direction, and the moving speed of the electronic device is less than a specified reference speed.

The instructions may further cause the processor to identify a location change of the electronic device with respect to a plurality of second directions perpendicular to the reference direction during the movement by the specified reference distance based on the movement information; and switch to the panorama capture mode when the movement distance of the electronic device is equal to or greater than a specified reference distance, the moving direction of the electronic device is the reference direction, and the location change is within the specified reference distance range.

The instructions may further cause the processor to store, in the preview mode, first images obtained by using the camera while tracking the movement distance in the memory, store, in the panorama capture mode, second images obtained by using the camera in the memory, and generate a panoramic image based on the first and second images stored in the memory.

The instructions may further cause the processor to delete the first images stored in the memory when the movement distance is less than the specified reference distance or the moving direction is different from the reference direction.

The instructions may further cause the processor to output screen information including a first menu capable of specifying some of the plurality of images to the display, and generate the panoramic image based on the images specified through the first menu.

The instructions may further cause the processor to further identify an object included in the plurality of images, and switch to the panorama capture mode when the movement distance of the electronic device is equal to or greater than the specified reference distance, the moving direction of the electronic device is the reference direction, and a specified object is included in the identified object.

The instructions may further cause the processor to output screen information for guiding the switching to the panorama capture mode when the movement distance of the electronic device is equal to or greater than the specified reference distance and the moving direction of the electronic device is the reference direction, and switch to the panorama capture mode when the electronic device moves further by another specified reference distance in the reference direction.

The instructions may further cause the processor to output, to the display, screen information including a second menu capable of selecting whether to switch to the panorama capture mode when the movement distance of the electronic device is equal to or greater than the specified reference distance and the moving direction of the electronic device is the reference direction, and switch to the panorama capture mode in response to a user input agreeing to switch to the panorama capture mode through the second menu.

FIGS. 3A to 3D are views illustrating examples of reference directions when the lateral direction of the electronic device according to an embodiment is vertically positioned. In FIGS. 3A to 3H, a time point t0 is a time point when the processor 150 starts to track the movement of the electronic device 100, and a time point t1 is a time point when the processor 150 identifies that the movement distance of the electronic device 100 is equal to or greater than the specified reference distance, and the moving direction of the electronic device 100 is the reference direction.

Referring to FIGS. 3A to 3D, the lateral direction of the electronic device 100 (e.g., reference numeral 100 of FIG. 2) may be vertically positioned at the time point t1.

Figure 3A:
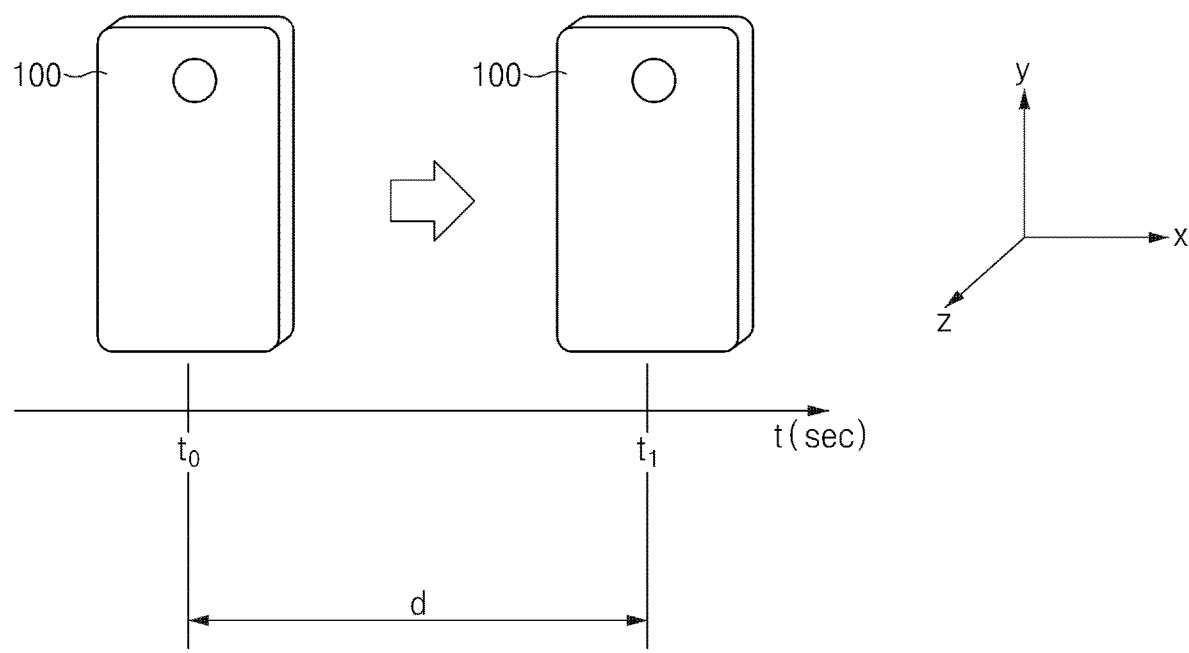
FIG. 3A, FIG. 3B, FIG. 3C and FIG. 3D are views illustrating examples of reference directions when the lateral direction of an electronic device according to an example embodiment is vertically positioned.

As shown in FIG. 3A, the processor 150 may identify that the electronic device 100 has been moved the specified reference distance, in the rightwards direction (i.e., the arrow of FIG. 3A corresponding to a +x axial direction) of the electronic device 100, at the time point t1, from among the upwards, downwards, leftwards and rightwards directions of the electronic device 100. In this case, the processor 150 may determine the rightwards direction as the reference direction, and determine upwards direction (e.g., the +y direction) and the downwards direction (e.g., the −y direction) as the plurality of second directions.

Figure 3B:
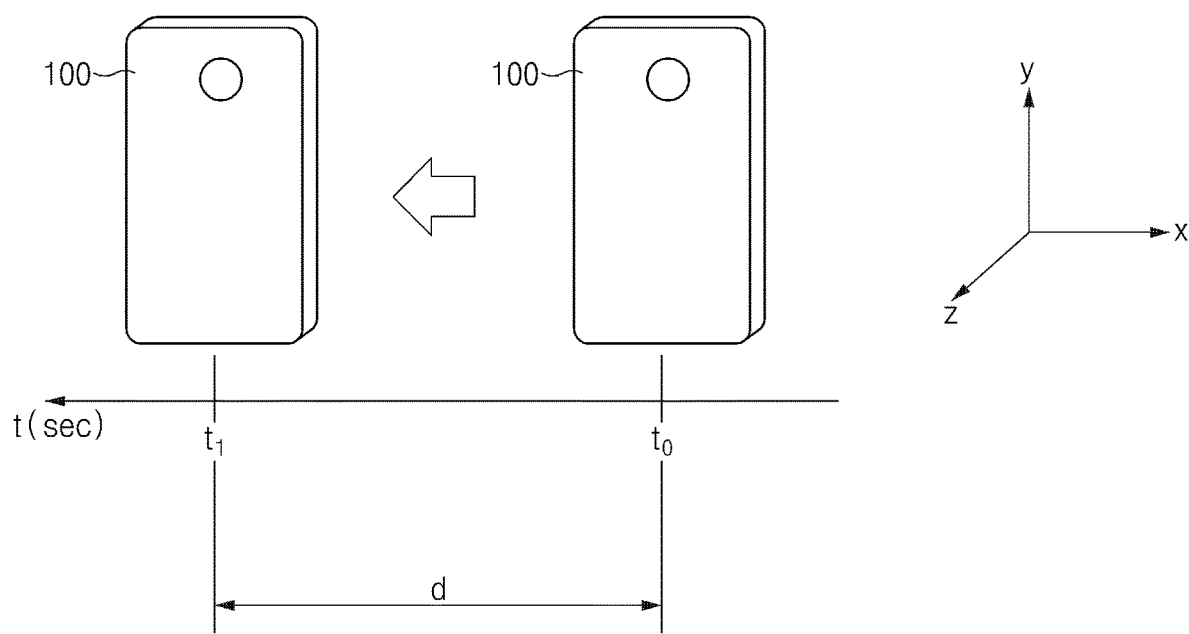

As shown in FIG. 3B, the processor 150 may identify that the electronic device 100 has been moved the specified reference distance, in the leftwards direction (i.e., the arrow of FIG. 3B corresponding to the −x axial direction) of the electronic device 100 at the time point t1, from among the upwards, downwards, leftwards and rightwards directions of the electronic device 100. In this case, the processor 150 may determine the leftwards direction as the reference direction, and determine the upwards direction (e.g., the +y direction) and the downwards direction (e.g., the −y direction) as the plurality of second directions.

Figure 3C:
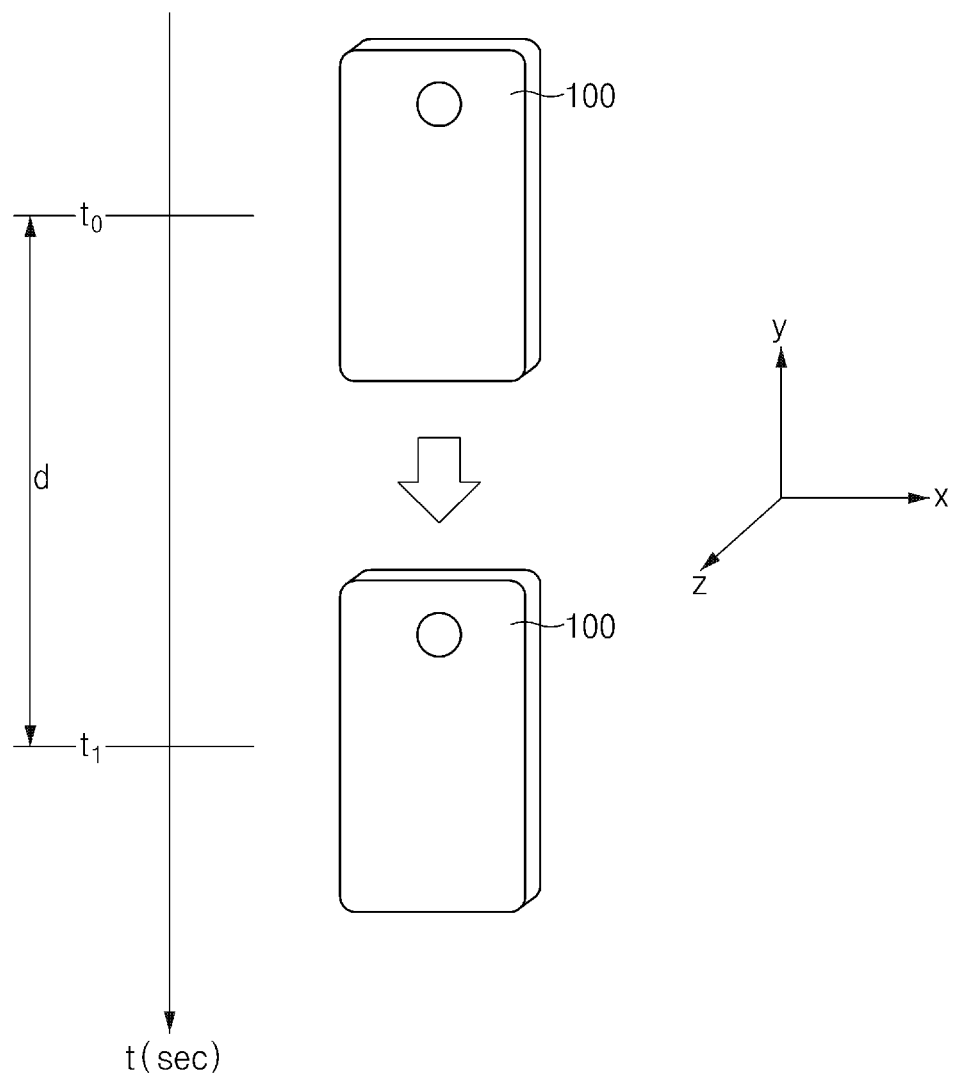

As shown in FIG. 3C, the processor 150 may identify that the electronic device 100 has been moved the specified reference distance in the downwards direction (i.e., the arrow of FIG. 3C corresponding to a −y axial direction) of the electronic device 100 at the time point t1, from among the upwards, downwards, leftwards and rightwards directions of the electronic device 100. In this case, the processor 150 may determine the downwards direction as the reference direction, and determine the leftwards direction (e.g., the −x axial direction) and the rightwards direction (e.g., the +x axial direction) as the plurality of second directions.

Figure 3D:
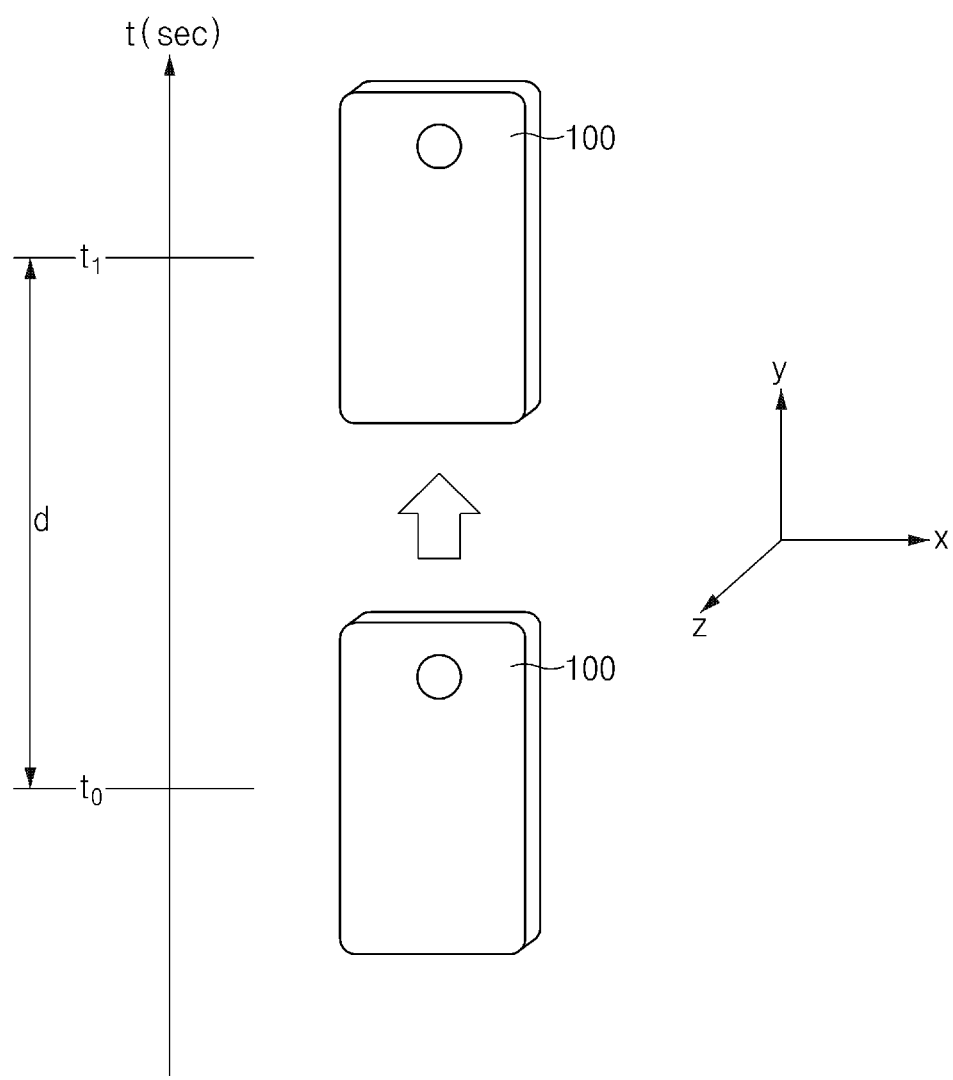

As shown in FIG. 3D, the processor 150 may identify that the electronic device 100 has been moved the specified reference distance in the upwards direction (i.e., the arrow of FIG. 3D corresponding to the +y axial direction) of the electronic device 100 at the time point t1, from among the upwards, downwards, leftwards and rightwards directions of the electronic device 100. In this case, the processor 150 may determine the upwards direction as the reference direction and determine the leftwards direction (e.g., the −x direction) and the rightwards direction (e.g., the +x axial direction) as the plurality of second directions.

FIGS. 3E to 3H are views illustrating examples of the reference directions when the lateral direction of the electronic device is horizontally positioned according to an example embodiment. In FIGS. 3E to 3H, a time point t0 is a time point when the processor 150 begins to track the movement of the electronic device 100, and a time point t1 is a time point when the processor 150 identifies that the movement distance of the electronic device 100 is equal to or greater than the specified reference distance, and the moving direction of the electronic device 100 matches the reference direction.

Figure 3E:
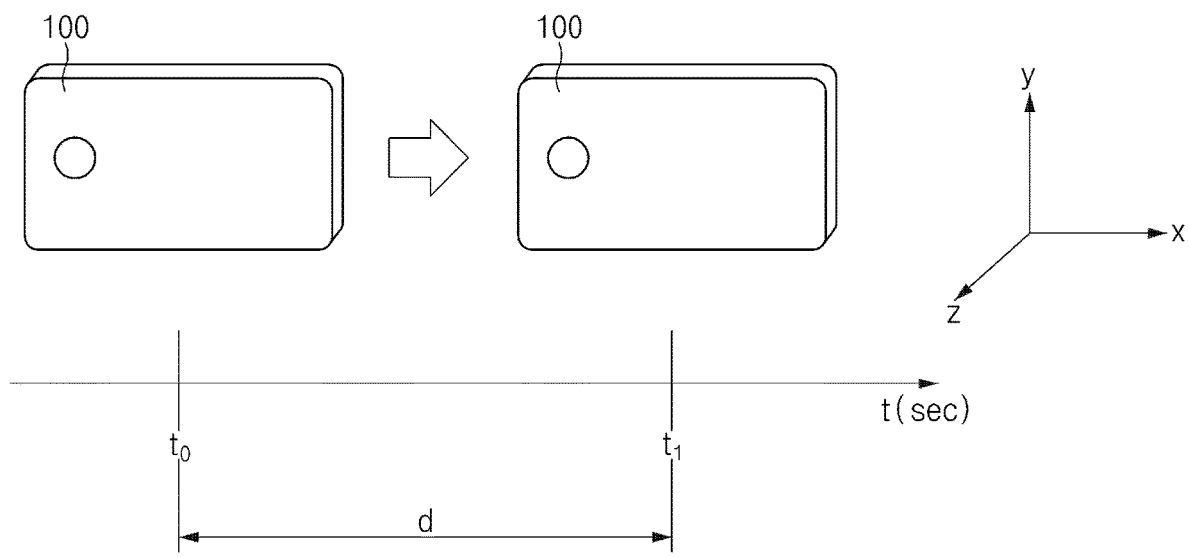
FIG. 3E, FIG. 3F, FIG. 3G and FIG. 3H are views illustrating examples of the reference directions when the lateral direction of an electronic device according to an example embodiment is horizontally positioned.

Referring to FIG. 3E, the processor 150 may identify that the electronic device 100 has been moved the specified reference distance in the downwards direction (i.e., the arrow of FIG. 3E: corresponding to the +x axial direction of FIG. 3E) of the electronic device 100 at the time point t1 among the upwards, downwards, leftwards and rightwards directions of the electronic device 100. In this case, the processor 150 may determine the downwards direction as the reference direction, and determine the leftwards direction (e.g., the −y axial direction) and the rightwards direction (e.g., the +y axial direction) as the plurality of second directions.

Figure 3F:
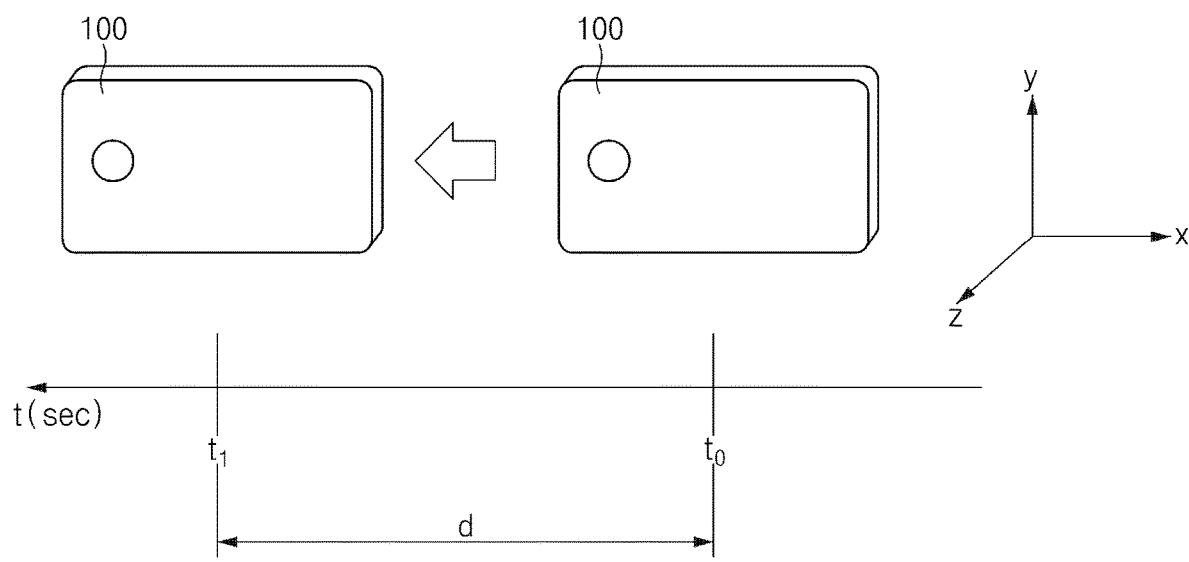

As shown in FIG. 3F, the processor 150 may identify that the electronic device 100 has been moved the specified reference distance corresponds to the upper side direction (see the arrow of FIG. 3F: e.g., the −x direction) of the electronic device 100 among the upper side, lower side, left and right directions of the electronic device 100. In this case, the processor 150 may determine the upper side direction as the reference direction and determine the left direction (e.g., the −y direction) and the right direction (e.g., the +y direction) of the electronic device 100 at the time point t1 as the plurality of second directions.

Figure 3G:
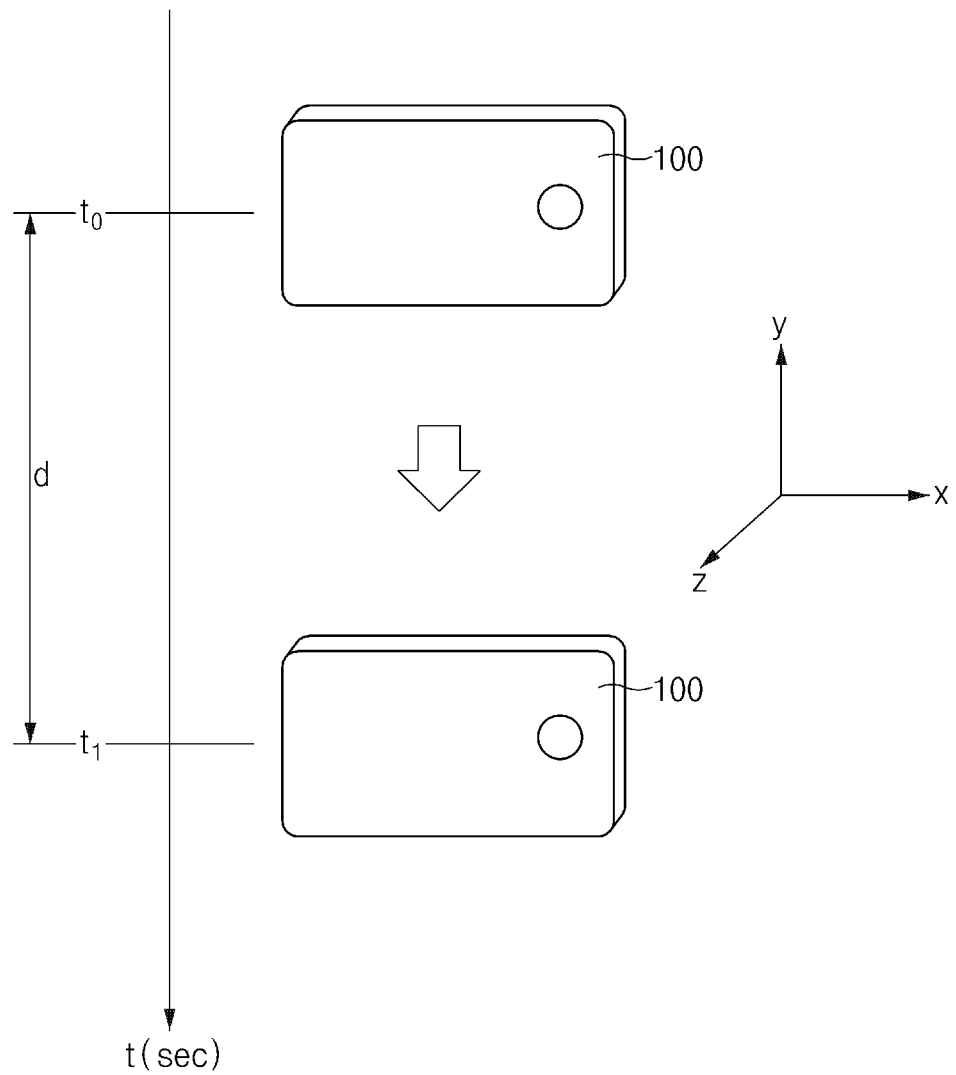

As shown in FIG. 3G, the processor 150 may identify that the moving direction of the electronic device 100 moved by the specified reference distance in the rightwards direction (i.e., the arrow of FIG. 3G corresponding to the −y axial direction) of the electronic device 100 from among the upwards, downwards, leftwards and rightwards directions of the electronic device 100. In this case, the processor 150 may determine the rightwards direction of the electronic device at the time point t1 to be the reference direction and determine the upwards direction (i.e., the +x axial direction) and the rightwards direction (i.e., the −x axial direction) of the electronic device 100 as the plurality of second directions.

Figure 3H:
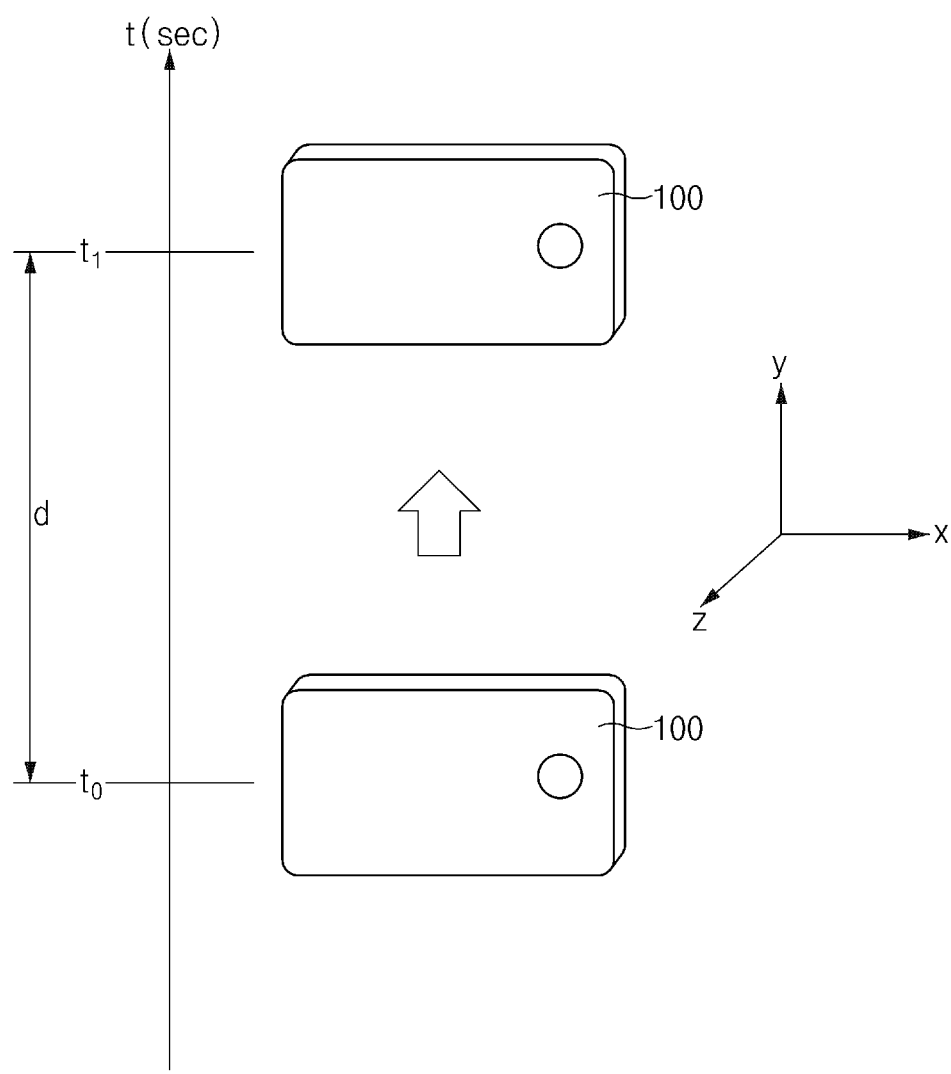

As shown in FIG. 3H, the processor 150 may identify that the moving direction of the electronic device 100 moved by the specified reference distance in the leftwards direction (i.e., the arrow of FIG. 3H corresponding to the +y axial direction) of the electronic device 100 among the upwards, downwards, leftwards and rightwards directions of the electronic device 100. In this case, the processor 150 may determine the leftwards direction of the electronic device at the time point t1 to be the reference direction and determine the upwards direction (i.e., the +x axial direction) and the rightwards direction (i.e., the −x axial direction) of the electronic device 100 as the plurality of second directions.

Figure 4A:
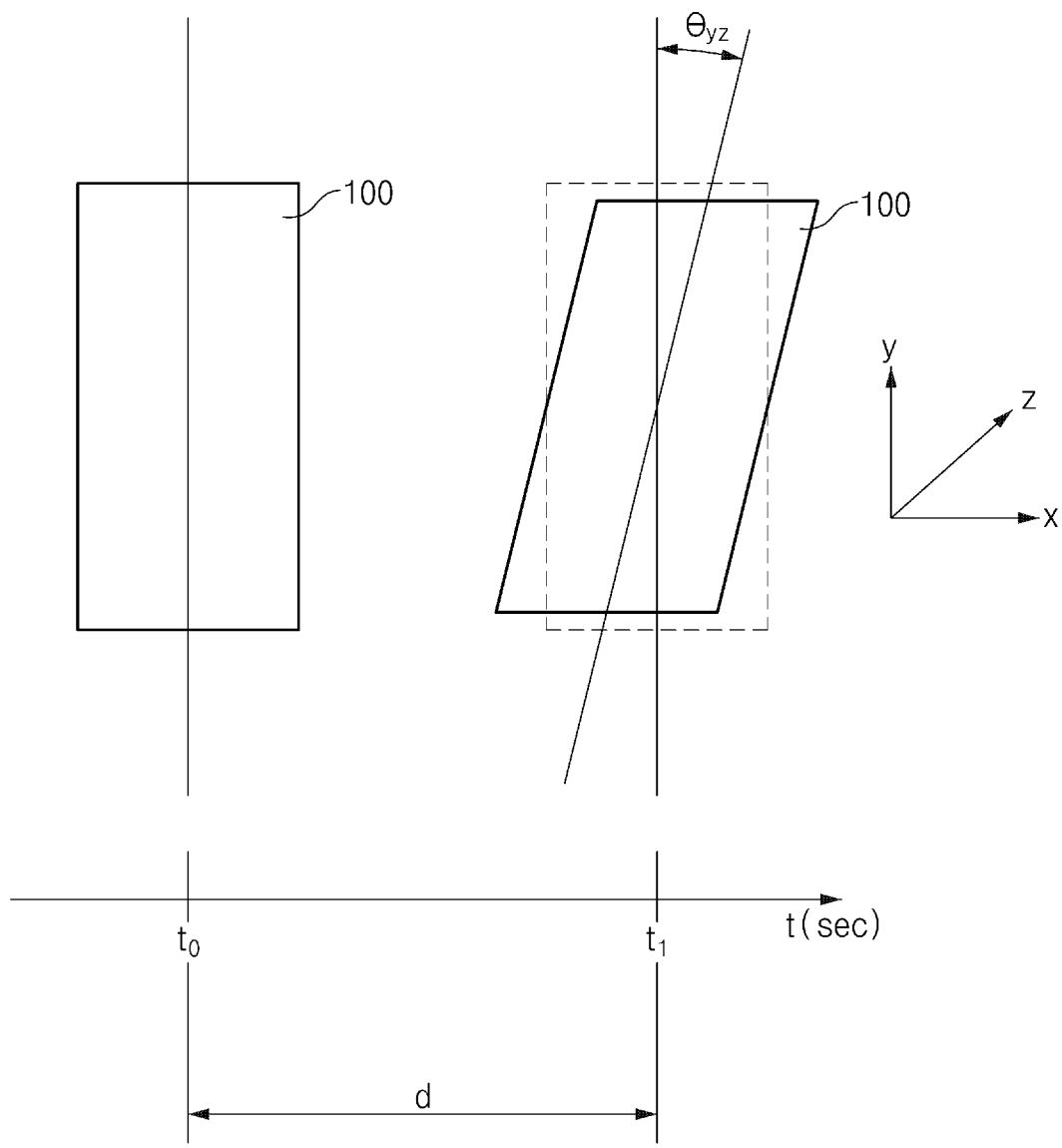
FIG. 4A is a view illustrating an angle change in the yz-axis direction of an electronic device according to an example embodiment.

FIG. 4A is a view illustrating an angle change in the yz-axis direction of the electronic device according to an example embodiment. The time point t0 may be a time point at which the processor 150 begins tracking the movement of the electronic device 100. The time point t1 may be a time point at which the processor 150 identifies that the movement distance 'd' of the electronic device 100 is equal to or greater than the prespecified reference distance, and the moving direction of the electronic device 100 corresponds to the prespecified reference direction.

Referring to FIG. 4A, when it is identified that the movement distance 'd' of the electronic device 100 is equal to or greater than the prespecified reference distance and the moving direction of the electronic device 100 corresponds to (e.g., matches) the prespecified reference direction, the processor 150 (e.g., the processor 150 of FIG. 2) may identify an angle change of the electronic device 100 in the yz-axis direction (e.g., a rotation pivoting on the x axis), while movement continues for the prespecified reference distance, based on the movement information. For example, the processor 150 may identify (e.g., detect) an angle change "Oyz" in the yz-axis direction of the electronic device 100 the time period from the time point t0 to the time point t1 based on the movement information. The processor 150 may determine whether the angle change in the yz-axis direction is within a first specified reference range (e.g., a tolerance for angle changes, such as from +10 degrees to −10 degrees). For example, the angle change in the yz-axis direction may include an angle change in a direction from the front surface of the electronic device 100 toward the rear surface of the electronic device 100, based on the lateral direction of the electronic device 100, or an angle change in a direction from the rear surface of the electronic device 100 toward the front surface of the electronic device 100.

Figure 4B:
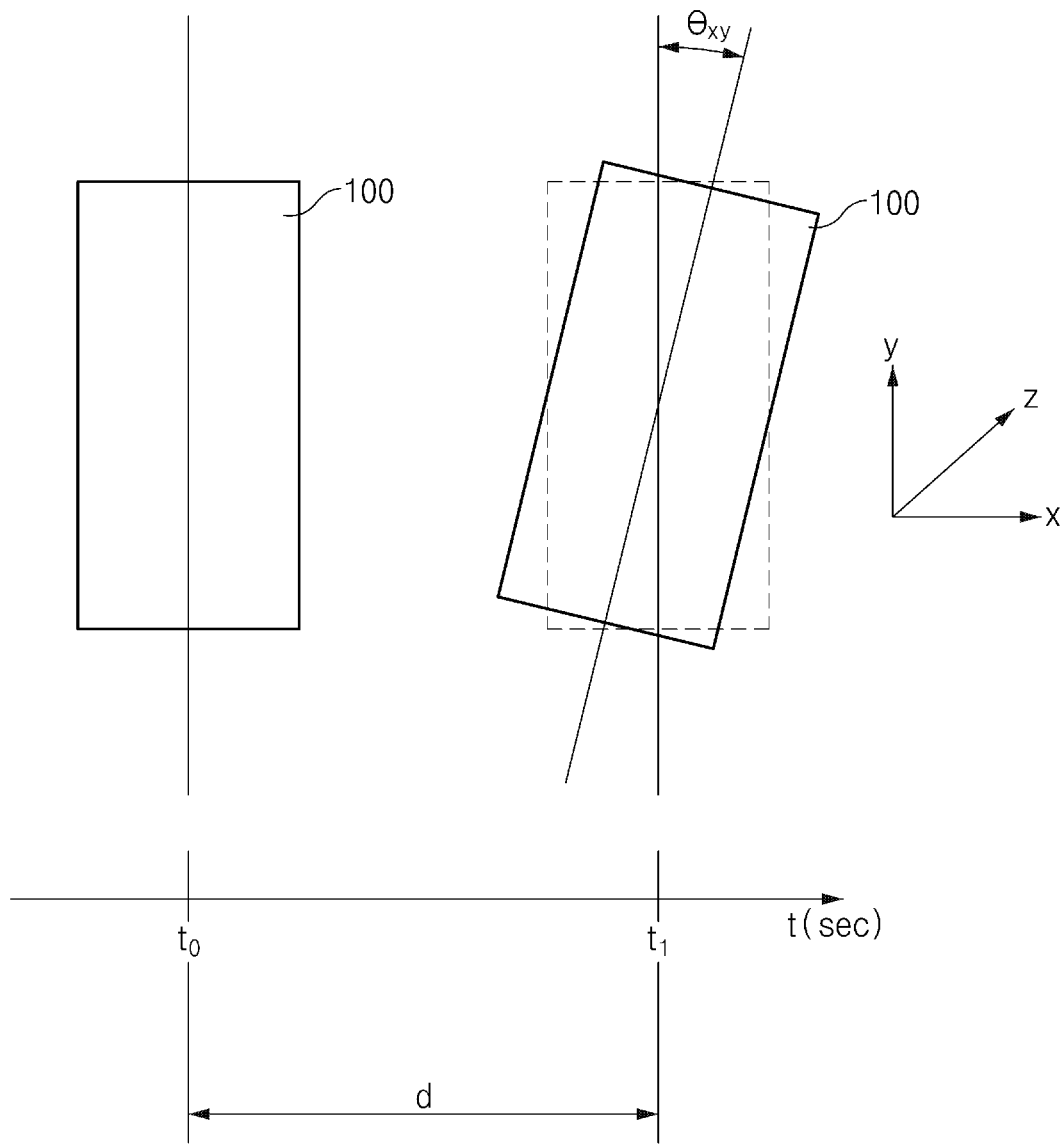
FIG. 4B is a view illustrating an angle change in the xy-axis direction of an electronic device according to an example embodiment.

FIG. 4B is a view illustrating an angle change in the xy-axis direction of the electronic device according to an embodiment. The time point t0 may be a time point at which the processor 150 begins to track the movement of the electronic device 100. The time point t1 may be a time point at which the processor 150 identifies that the movement distance 'd' of the electronic device 100 is now equal to or greater than the prespecified reference distance, and the moving direction of the electronic device 100 matches the prespecified reference direction.

Referring to FIG. 4B, when it is identified that the movement distance 'd' of the electronic device 100 is equal to or greater than the prespecified reference distance, and the moving direction of the electronic device 100 matches the reference direction, the processor 150 (e.g., the processor 150 of FIG. 2) may identify (e.g., detect) an angle change of the electronic device 100 in the xy-axis direction (i.e., a rotation pivoting on the z axis), while movement continues to the specified reference distance, based on the movement information. For example, the processor 150 may identify the angle change Oxy in the xy-axis direction of the electronic device 100 for the time period spanning from the time point t0 to the time point t1, based on the movement information. The processor 150 may determine whether the angle change in the xy-axis direction is within a second specified reference range (e.g., a tolerance for angle changes, such as from +10 degrees to −10 degrees). For example, the angle change in the xy-axis direction may include a clockwise angle change or a counterclockwise angle change of the front or rear surface of the electronic device 100.

Figure 4C:
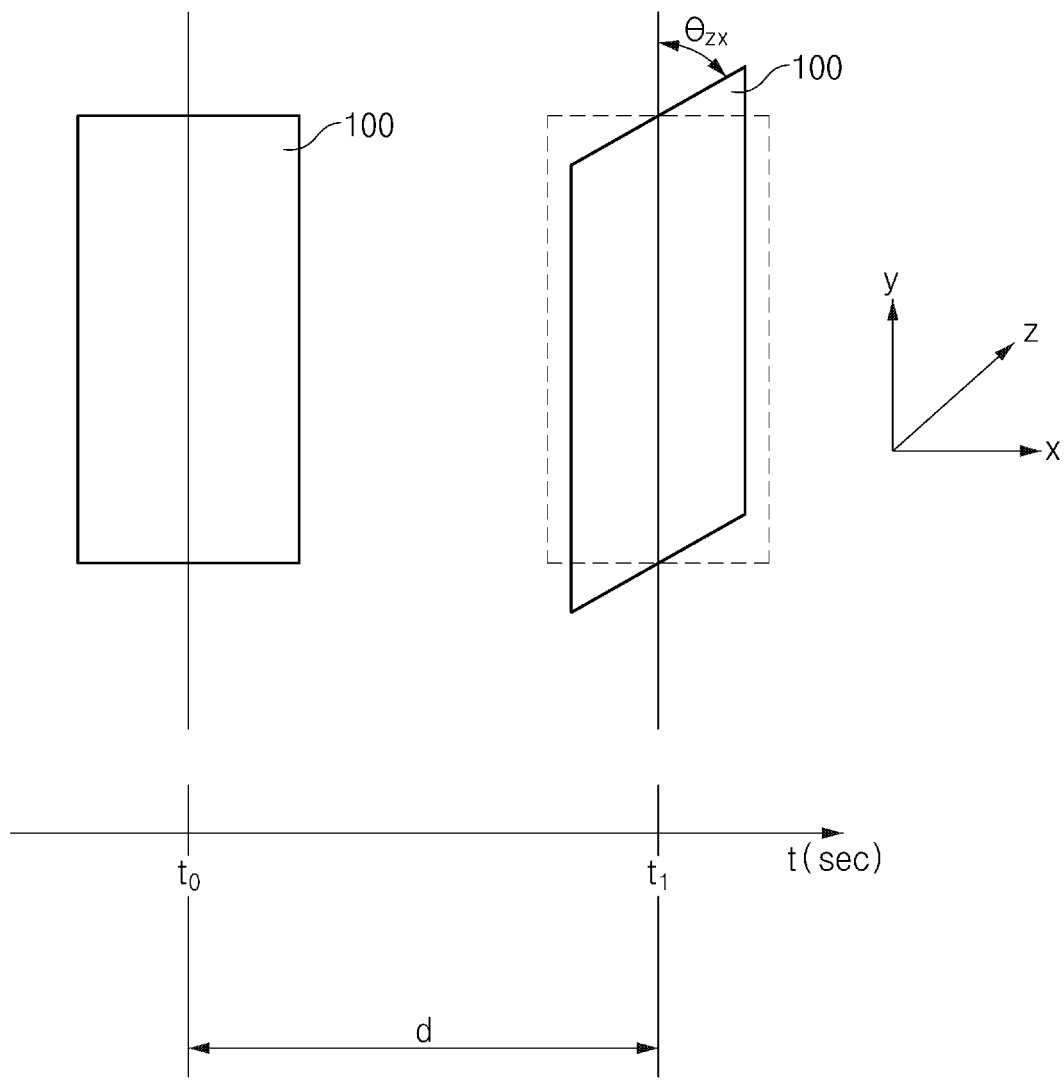
FIG. 4C is a view illustrating an angle change in the zx-axis direction of an electronic device according to an example embodiment.

FIG. 4C is a view illustrating an angle change in the zx-axis direction of the electronic device according to an embodiment. The time point t0 may be a time point at which the processor 150 begins to track the movement of the electronic device 100. The time point t1 may be a time point at which the processor 150 identifies that the movement distance 'd' of the electronic device 100 is now equal to or greater than the specified reference distance and the moving direction of the electronic device 100 matches the prespecified reference direction.

Referring to FIG. 4C, when it is identified that the movement distance 'd' of the electronic device 100 is equal to or greater than the prespecified reference distance and the moving direction of the electronic device 100 matches the prespecified reference direction, the processor 150 (e.g., the processor 150 of FIG. 2) may identify (e.g., detect) an angle change of the electronic device 100 in the zx-axis direction (i.e., a rotation pivoting along the y axis), while movement continues to the prespecified reference distance, based on the movement information. For example, the processor 150 may identify (e.g., detect) an angle change Ozx in the zx-axis direction of the electronic device 100, for the time period spanning from the time point t0 to the time point t1 based on the movement information. The processor 150 may determine whether the angle change in the zx-axis direction is within a third specified reference range (e.g., a tolerance for angle changes, such as from +10 degrees to −10 degrees). For example, the angle change in the zx-axis direction may include an angle change in the direction from the front surface of the electronic device 100 toward the rear surface of the electronic device 100 based on the vertical direction of the electronic device 100, or an angle change in the direction from the rear surface of the electronic device 100 toward the front surface of the electronic device 100.

In the above-described FIGS. 4A to 4C, when the angle change of the electronic device 100 in the yz-axis direction is within the first prespecified reference range, or when the angle change of the electronic device 100 in the xy-axis direction is within the second prespecified reference range, or when the angle change of the electronic device 100 in the zx-axis direction is within the third prespecified reference range, the processor 150 may automatically switch from the preview mode to the panorama capture mode.

Figure 5A:
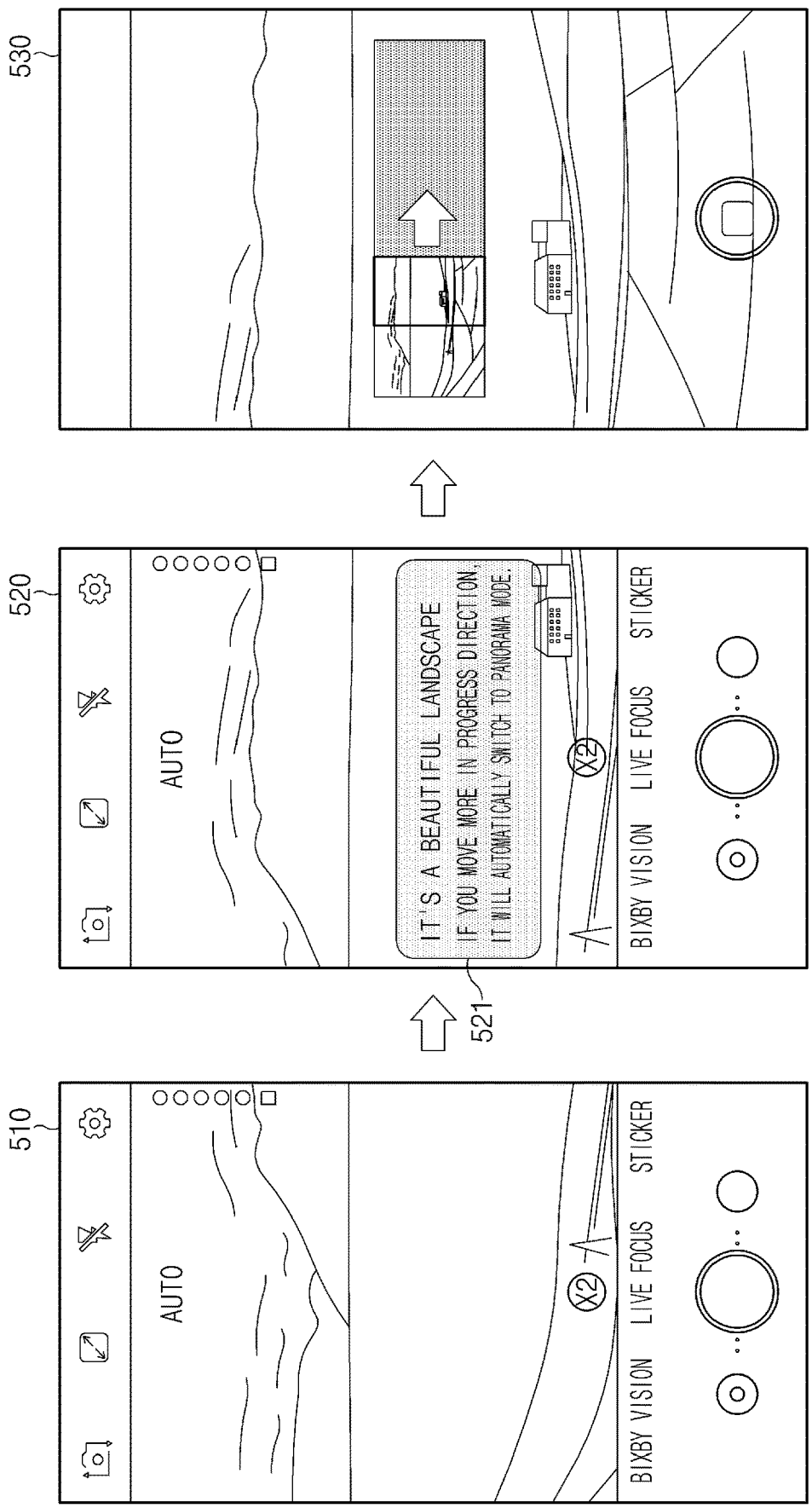
FIG. 5A is a view illustrating an example of a UI screen in a process of switching from a preview mode to a panorama capture mode according to an example embodiment.

FIG. 5A is a view illustrating an example of a UI screen that is displayed during a process of switching from a preview mode to a panorama capture mode, according to an example embodiment.

Referring to FIG. 5A, a screen 510 may be displayed, and a processor (e.g., the processor 150 of FIG. 2) may obtain an image using the camera 110 and, while executing a preview mode, output the obtained image (i.e., a preview image) to a display (e.g., the display 130 of FIG. 2). The processor 150 may determine whether the movement of the electronic device 100 meets a prespecified condition based on the movement information of the electronic device 100 (e.g., monitoring the movement periodically during a specified period of time) while outputting the preview image to the display 130 in the preview mode. For example, the specified condition may mandate that the movement distance of the electronic device 100 is equal to or greater than the prespecified reference distance, the moving direction of the electronic device 100 matches a prespecified reference direction, an angle change of the electronic device 100 is within the specified reference range of angle changes while the electronic device 100 is moved by the specified reference distance, and/or a specified object is included within the preview image.

In a screen 520, when the movement of the electronic device 100 meets the specified condition, the processor 150 may output on the display screen information 521 providing visual guidance facilitating automatic switching to the panorama capture mode. For example, when the electronic device 100 continues to move in the reference direction, the output screen information 521 may provide visual guidance to a user during the switch to the panorama capture mode.

In a screen 530, as a user moves the electronic device 100 further by another prespecified reference distance in the moving direction, then, when it is identified based on the movement information that the electronic device 100 has moved by the another prespecified reference distance (e.g., 5 cm) in the reference direction, the processor 150 may switch from the preview mode to the panorama capture mode. The processor 150 may generate a panoramic image based on images obtained by using the camera 110 in the preview mode.

Figure 5B:
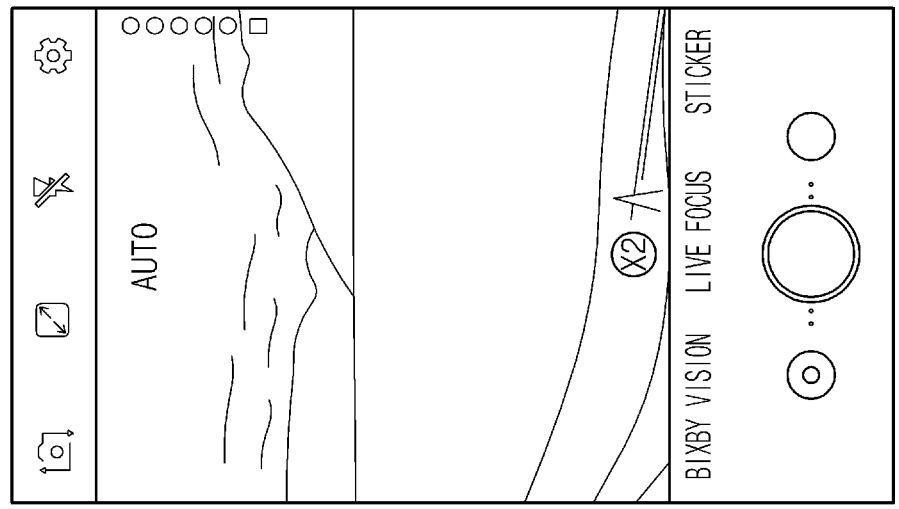
FIG. 5B is a view illustrating an example of a UI screen in a case of refusing to switch to a panorama capture mode according to an example embodiment.
Figure 5B:
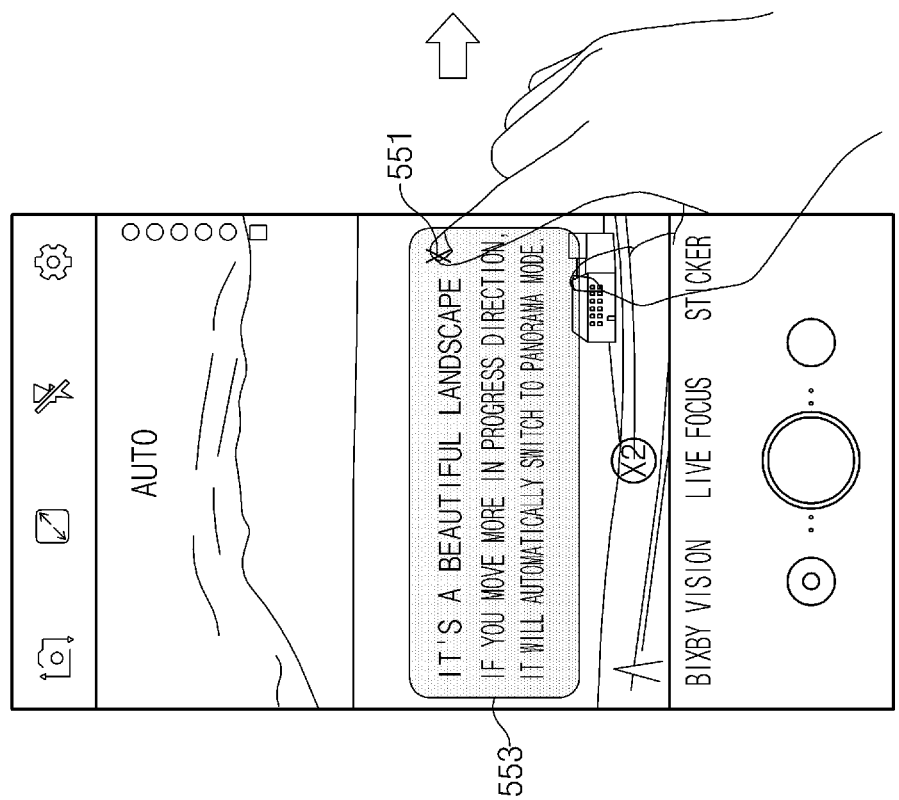

FIG. 5B is a view illustrating an example of a UI screen in a case where a switch to a panorama capture mode is refused, according to an embodiment.

Referring to FIG. 5B, when the movement of the electronic device 100 meets the prespecified condition, the processor 150 (e.g., the processor 150 of FIG. 2) may output, to the display 130, screen information 553 providing visual guidance for automatically switching to the panorama capture mode, and may include a termination button 551 selectable to prevent switching to the panorama mode, and maintaining the preview mode instead. For example, the screen information 553 may be information provided to guide switching to the panorama capture mode when the electronic device 100 is further moved in the reference direction.

When the termination button 551 is touched (or selected), the processor 150 may maintain the preview mode. The processor 150 may continue to output a preview image obtained by using the camera 110 in the preview mode.

Figure 6A:
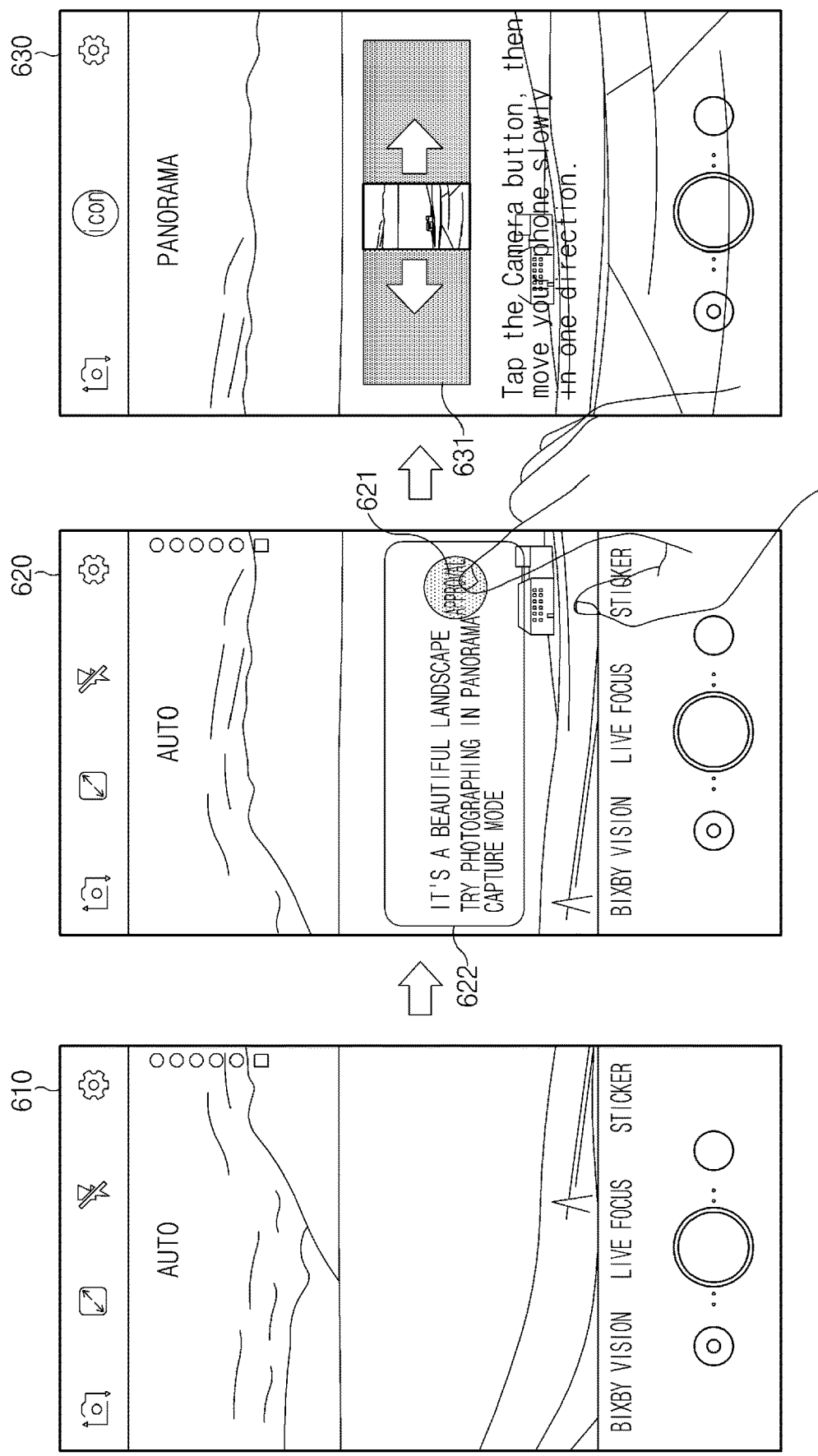
FIG. 6A is a view illustrating another example of a UI screen in a process of switching from a preview mode to a panorama capture mode according to an example embodiment.

FIG. 6A is a view illustrating another example of a UI screen in a process of switching from a preview mode to a panorama capture mode according to an embodiment.

Referring to FIG. 6A, in a screen 610, the processor (e.g., the processor 150 of FIG. 2) 150 may obtain an image using the camera 110 in the preview mode and may output the obtained image (i.e., a preview image) to a display (e.g., the display 130 of FIG. 2). The processor 150 may determine whether the movement of the electronic device 100 meets a prespecified condition, based on the movement information of the electronic device 100 (e.g., as periodically detected through a specified period of time) while outputting the preview image to the display 130 in the preview mode. For example, the prespecified condition may mandate that the movement distance of the electronic device 100 be equal to or greater than the prespecified reference distance, the moving direction of the electronic device 100 match the prespecified reference direction, the angle change of the electronic device 100 be within the specified reference range of angle changes while the electronic device 100 moves the specified reference distance, and/or a specified object be included in the preview image.

In a screen 620, when the movement of the electronic device 100 meets the prespecified condition, the processor 150 may output, to the display 130, a switching button 621 (e.g., an approval object) selectable to switch to the panorama capture mode. When the processor 150 receives a first user input (e.g., a touch input to the switching button 621), switching to the panorama capture mode is confirmed, and the processor 150 may switch to the panorama capture mode. For example, the first user input may include, for example, a touch input to the switching button 621. The processor 150 may maintain the preview mode when a second user input is received that rejects switching to the panorama capture mode. For example, the second user input may include a touch input to an area of the display 130 other than the switching button 621. When the preview mode is maintained, the processor 150 may monitor whether the electronic device 100 is in a state requesting automatic switching to the panorama capture mode, by tracking the movement of the electronic device 100 periodically through a specified period of time.

In the screen 630, after switching to the panorama capture mode, the processor 150 may output screen information including a selection button 631 selectable to set a "generation direction" or "progress direction" for the panoramic image, meaning a direction in which the camera will be panned to generate the panoramic image. For example, the selection button 631 may be related to a menu for selecting the progress direction (e.g., the left or right direction) of the electronic device 100 in the panorama capture mode. The processor 150 may identify a third user input (e.g., a touch input selecting a progress direction) that selects a progress direction of the electronic device 100 through the selection button 631, and may generate a panoramic image by using the images obtained by using the camera 110 while the camera is panned in the selected progress direction.

Figure 6B:
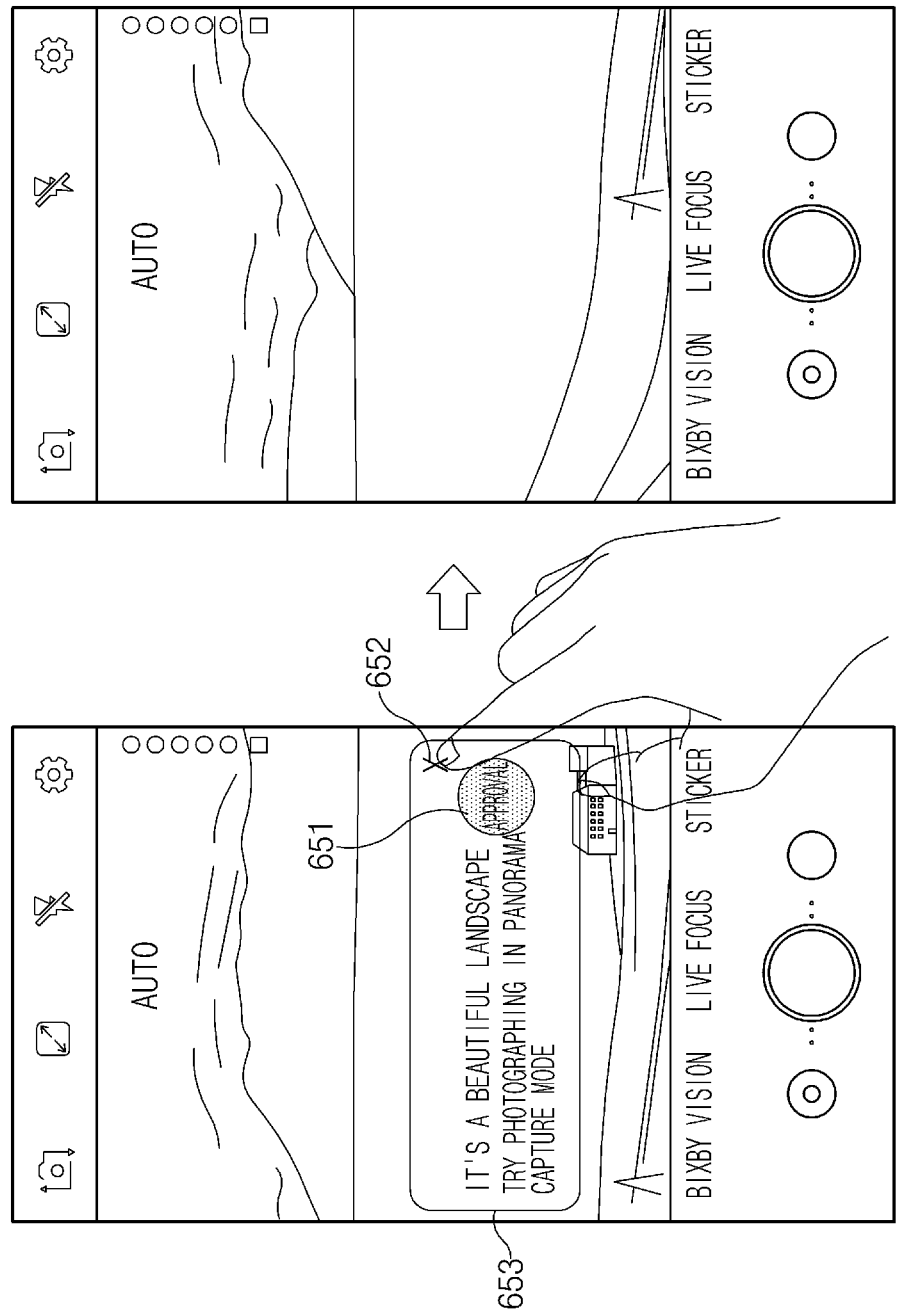
FIG. 6B is a view illustrating another example of the UI screen in a case of refusing to switch to a panorama capture mode according to an example embodiment

FIG. 6B is a view illustrating another example of the UI screen when a switch to a panorama capture mode is rejected, according to an embodiment.

Referring to FIG. 6B, when movement of the electronic device 100 meets a prespecified condition, the processor 150 (e.g., the processor 150 of FIG. 2) may output, to the display 130, screen information 653 including a switching button (e.g., an 'approval' object) 651 selectable to switch to the panorama capture mode, and a termination button 652 selectable to maintain the preview mode without switching to the panorama mode.

When the termination button 652 is touched (or selected) by a user, the processor 150 may be maintained in the preview mode. The processor 150 may output a preview image obtained using the camera 110 in the preview mode.

Figure 7A:
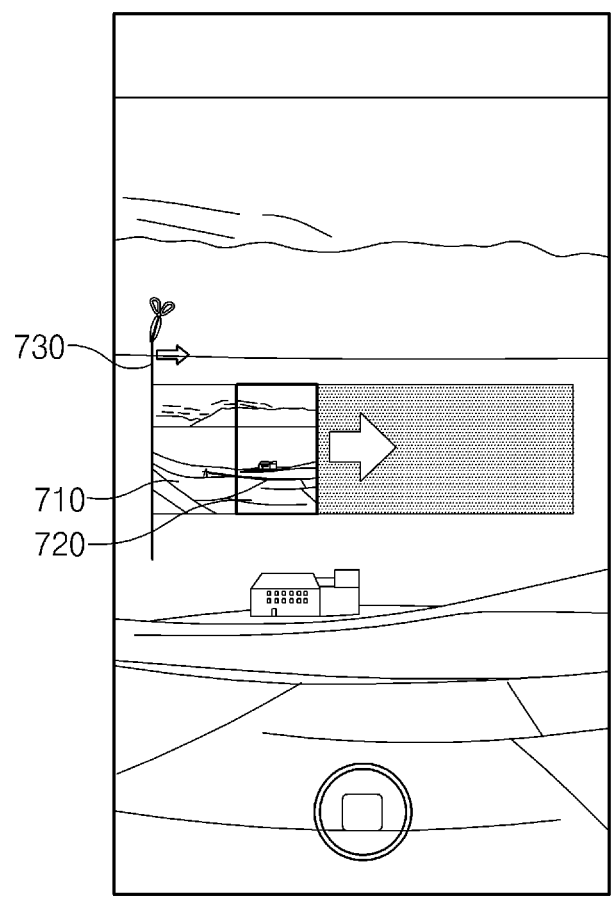
FIG. 7A is a view illustrating a UI screen in a panorama capture mode according to an example embodiment.

FIG. 7A is a view illustrating a UI screen in a panorama capture mode according to an embodiment.

Referring to FIG. 7A, the processor 150 (e.g., the processor 150 of FIG. 2) may generate a panoramic image by attaching the first images obtained in the preview mode in advance of the second images obtained in the panorama capture mode. In this case, the panoramic image may include an area 710 generated by using the first images and an area 720 generated by using the second images.

When the processor 150 obtains the second images in the panorama capture mode, the processor 150 may output at least a portion of the generated panoramic image to the display 130 while generating the panoramic image based on the obtained second images. The processor 150 may output, to the display 130, an editing object 730 for selecting one or more images to be used for generating the panoramic image from among the first images. For example, the editing object 730 may be displayed as a line formed on a starting position of the panoramic image output to the display 130. For example, when the panoramic image is an image in which a plurality of images are connected to each other, aligned in a single row of images, the editing object 730 may be disposed over an image forming a first column of the row of images forming the panoramic image. When the panoramic image is an image in which a plurality of images are connected to each other as arranged as a column, the editing object 730 may be disposed adjacent to an image forming a first row of the column of images in the panoramic image. As another example, the editing object 730 may be dragged and moved by a user. When the editing object 730 is dragged and moved by a user, the processor 150 may exclude, from the panoramic image, the previous images in the area in which the moved editing object 730 is located, among the plurality of images forming the panoramic image.

Figure 7B:
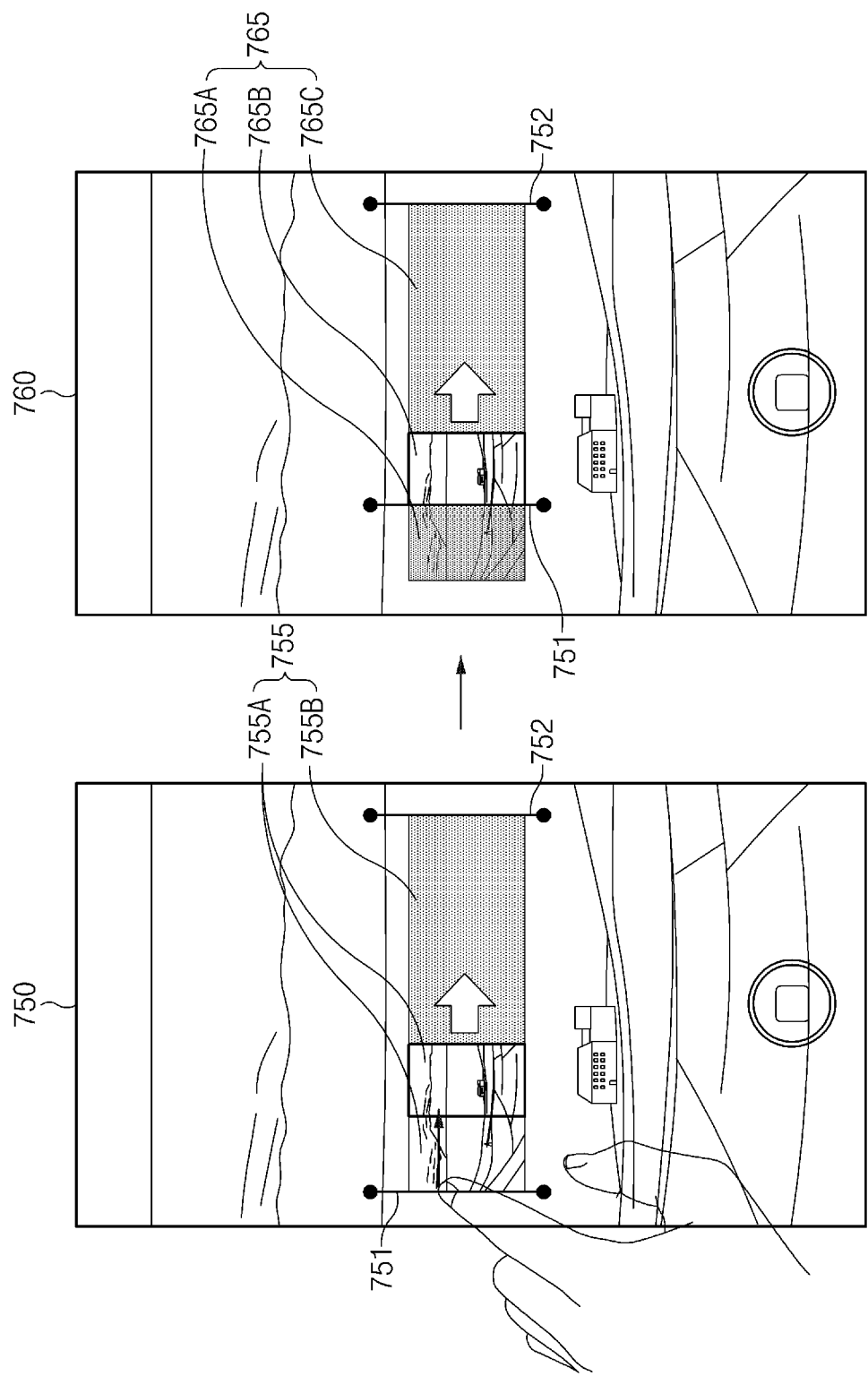
FIG. 7B is a view illustrating a UI screen in a process of selecting an image to be included in a panoramic image according to an example embodiment.

FIG. 7B is a view illustrating a UI screen in a process of selecting one or more images to be included in a panoramic image according to an embodiment.

Referring to FIG. 7B, when the processor 150 (e.g., the processor 150 of FIG. 2) switches to the panorama capture mode, as shown in a screen 750, the processor 150 may output a first preview panoramic image 755, which is generated by couple each of the first images together, edge by edge, the first images obtained in the preview mode before the second images are obtained in the panorama capture mode. The processor 150 may further output a first editing object 751, which may be located on a first image from among the first images. The processor 150 may further output a second editing object 752, which may be located on an expected final image of the panoramic image. The first preview panoramic image 755 may include a first display area 755A representing a generated panoramic image and a second display area 755B representing a panoramic image to be generated. The first display area 755A may include an area representing the panoramic image generated from the first images and an area representing the panoramic image from the second images.

When the first editing object 751 is dragged (e.g., dragged in a right direction), the processor 150 may output a second preview panoramic image 765 corresponding to the dragged position as shown in the screen 760. The second preview panoramic image 765 may be altered in that the first editing object 751 may be dragged to set a leftmost boundary of the second preview panoramic image 765. According, the second preview panoramic image 765 may now include a third display area 765A, representing an image to be excluded from the panoramic image due to the movement of the first editing object 751, a fourth display area 765B representing an image included in the panoramic image, and a fifth display area 765C representing the panoramic image to be generated. The third display area 765A may be darkly processed (e.g., dim processing) and displayed. Thereafter, the panoramic image, which is generated when the panorama capture mode is terminated, may be a panoramic image generated from the images from the start image corresponding to the first editing object 751 to the end image corresponding to the second editing object 752. Notably, the second editing object 752 may be dragged as well (e.g., leftwards) in order to set a rightmost boundary of the second preview panoramic image 765.

Figure 7C:
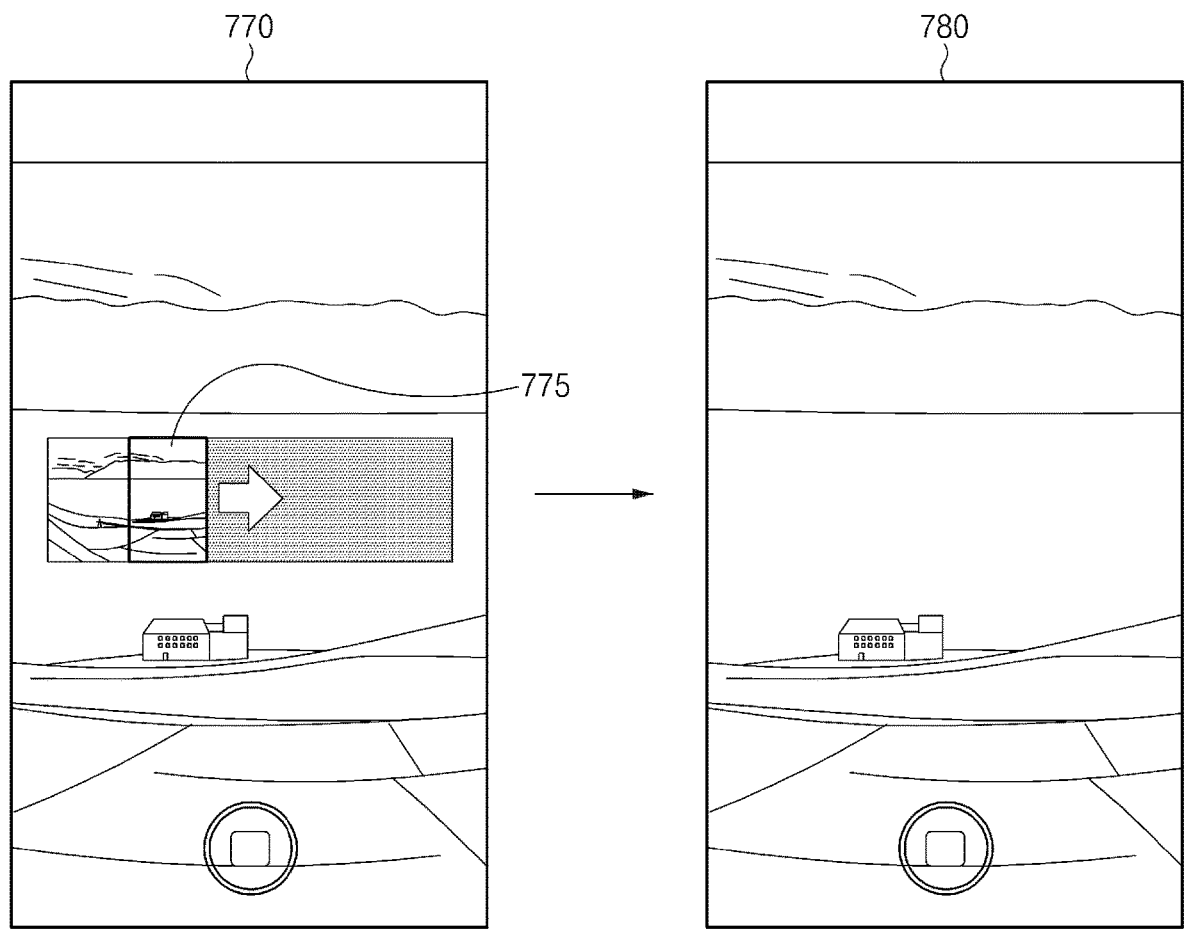
FIG. 7C is a view illustrating a UI screen when a panorama capture mode is terminated according to an example embodiment.

FIG. 7C is a view illustrating a UI screen when the panorama capture mode is terminated according to an embodiment.

Referring to FIG. 7C, as shown in a screen 770, the processor (e.g., the processor 150 of FIG. 2) may terminate the panorama capture mode based on at least one of a user input or movement information of the electronic device (e.g., the electronic device 100 of FIG. 2). For example, when the processor 150 identifies a user input requesting for the termination of the panorama capture mode while photographing a panoramic image in the panorama capture mode, the processor 150 may terminate the panorama capture mode. As another example, when the panoramic image is completed in the panorama capture mode, the processor 150 may terminate the panorama capture mode. As still another example, when the movement information of the electronic device 100 meets another specified condition, the processor 150 may terminate the panoramic photographing. For example, the another specified condition may include a condition in which the angle change of the electronic device is out of the angular range in which the panoramic image can be generated. For example, the another specified condition may include a condition in which the speed change of the electronic device 100 is out of the maximum speed at which the panoramic image can be generated. According to certain embodiments, when the panorama capture mode is terminated before the panoramic image is completed, the processor 150 may delete the panoramic image stored in memory (e.g., the memory 140 of FIG. 2).

As shown in a screen 780, when the panorama capture mode is terminated, the processor 150 may switch to the preview mode.

Figure 8:
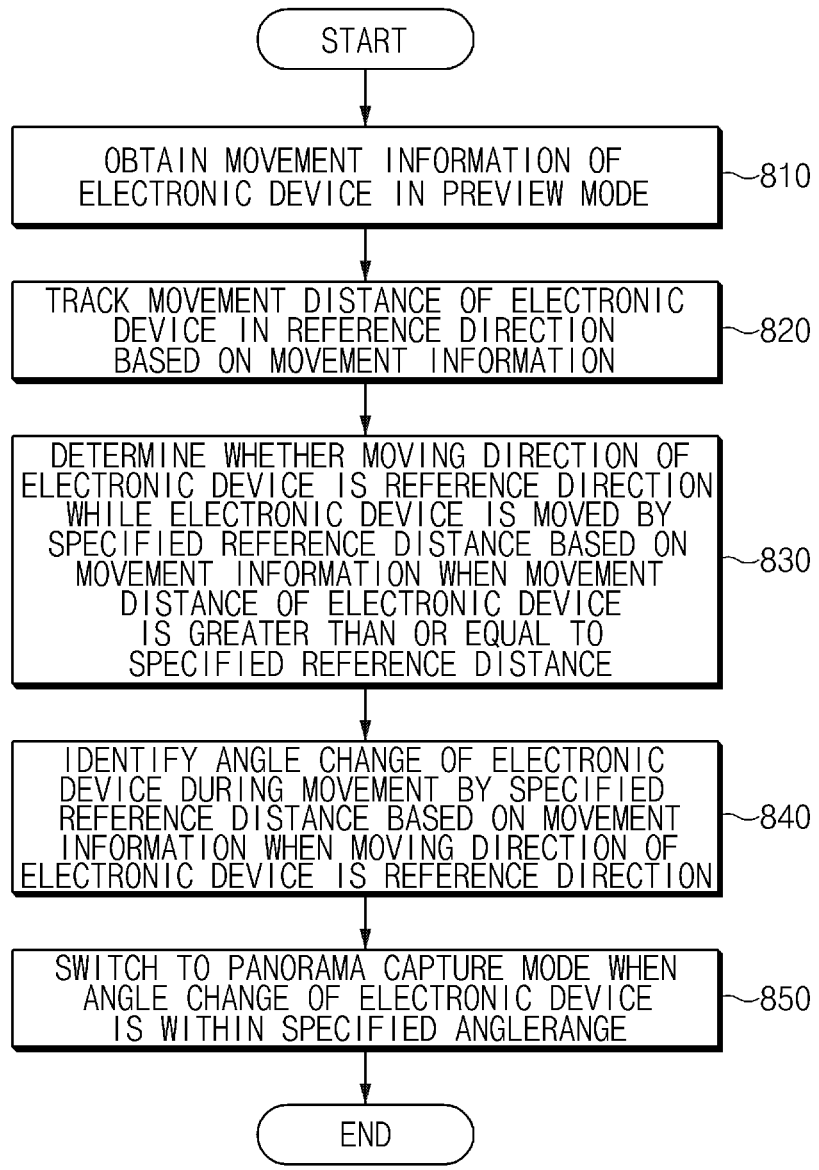
FIG. 8 is a flowchart illustrating a photographing method according to an example embodiment.

FIG. 8 is a flowchart illustrating a photographing method according to an embodiment.

Referring to FIG. 8, in operation 810, the processor (e.g., the processor 150 of FIG. 2), may obtain the movement information of the electronic device 100 by using the sensor circuit (e.g., reference numeral 120 of FIG. 2) in the preview mode.

In operation 820, the processor 150 may track the movement distance of the electronic device based on the movement information based on the movement information.

In operation 830, when the movement distance of the electronic device 100 is greater than or equal to the pre-specified reference distance, the processor 150 may determine whether the moving direction of the electronic device 100 matches the reference direction based on the movement information, while the electronic device 100 continues to move unto the prespecified reference distance.

In operation 840, when the moving direction of the electronic device 100 is the reference direction, the processor 150 may identify angle change of the electronic device 100 based on the movement information.

In operation 850, when the angle change of the electronic device 100 is within a specified angle range, the processor 150 may switch from the preview mode to the panorama capture mode.

According to certain embodiments, the processor 150 may first identify the moving direction and the angle change of the electronic device 100 based on the movement information of the electronic device 100, and then, may switch from the preview mode to the panorama capture mode based on at least the movement distance of the electronic device 100. In addition, the processor 150 may determine whether the electronic device 100 has been stopped for a specified time based on the movement information, and may start to track the movement distance of the electronic device 100 when the electronic device 100 has been stopped for the specified time.

According to an embodiment, a photographing method by an electronic device (e.g., the electronic device 100 of FIG. 2) may include obtaining movement information by using a sensor circuit (e.g., the display 130 of FIG. 2) in a preview mode for outputting an image obtained by using a camera (e.g., the camera 110 of FIG. 2) to a display (e.g., the display 130 of FIG. 2); tracking a movement distance of the electronic device based on the movement information; determining whether a moving direction of the electronic device is a specified reference direction during the movement by the specified reference distance based on the movement information based on the movement information when the movement distance of the electronic device is equal to or greater than a specified reference distance; and switching to a panorama capture mode when the moving direction of the electronic device is the reference direction.

The reference direction may include at least one of a left direction, a right direction, an upward direction, and a downward direction of the electronic device moved by the specified reference distance.

The method may further include identifying an angle change of the electronic device during the movement by the specified reference distance based on the movement information, where the switching may include switching to the panorama capture mode when the moving direction of the electronic device is the reference direction and the angle change is within a specified reference range.

The identifying of the angle change may include identifying at least one of an angle change in an xy axis direction, an angle change in an yz axis direction, or an angle change in a zx axis direction among specified three-axis directions.

According to an embodiment, the photographing method may further include storing, in the preview mode, first images obtained by using the camera while tracking the movement distance in a memory; storing, in the panorama capture mode, second images obtained by using the camera in the memory; and generating a panoramic image based on the first and second images stored in the memory.

According to an embodiment, the photographing method may further include outputting screen information including a first menu capable of specifying some of the plurality of images to the display; and generating the panoramic image based on the images specified through the first menu.

According to an embodiment, the photographing method may further include identifying a moving speed of the electronic device while the electronic device is moved by the specified reference distance, based on the movement information, where the switching may include switching to the panorama capture mode when the movement distance of the electronic device is greater than or equal to the specified reference distance, the moving direction of the electronic device is the reference direction, and the moving speed of the electronic device is less than a specified reference speed.

According to an embodiment, the photographing method may further include identifying a location change of the electronic device with respect to a plurality of second directions perpendicular to the reference direction during the movement by the specified reference distance based on the movement information, where the switching may include switching to the panorama capture mode when the movement distance of the electronic device is equal to or greater than a specified reference distance, the moving direction of the electronic device is the reference direction, and the location changes of the electronic device in the second directions are within a specified reference distance range.

Figure 9:
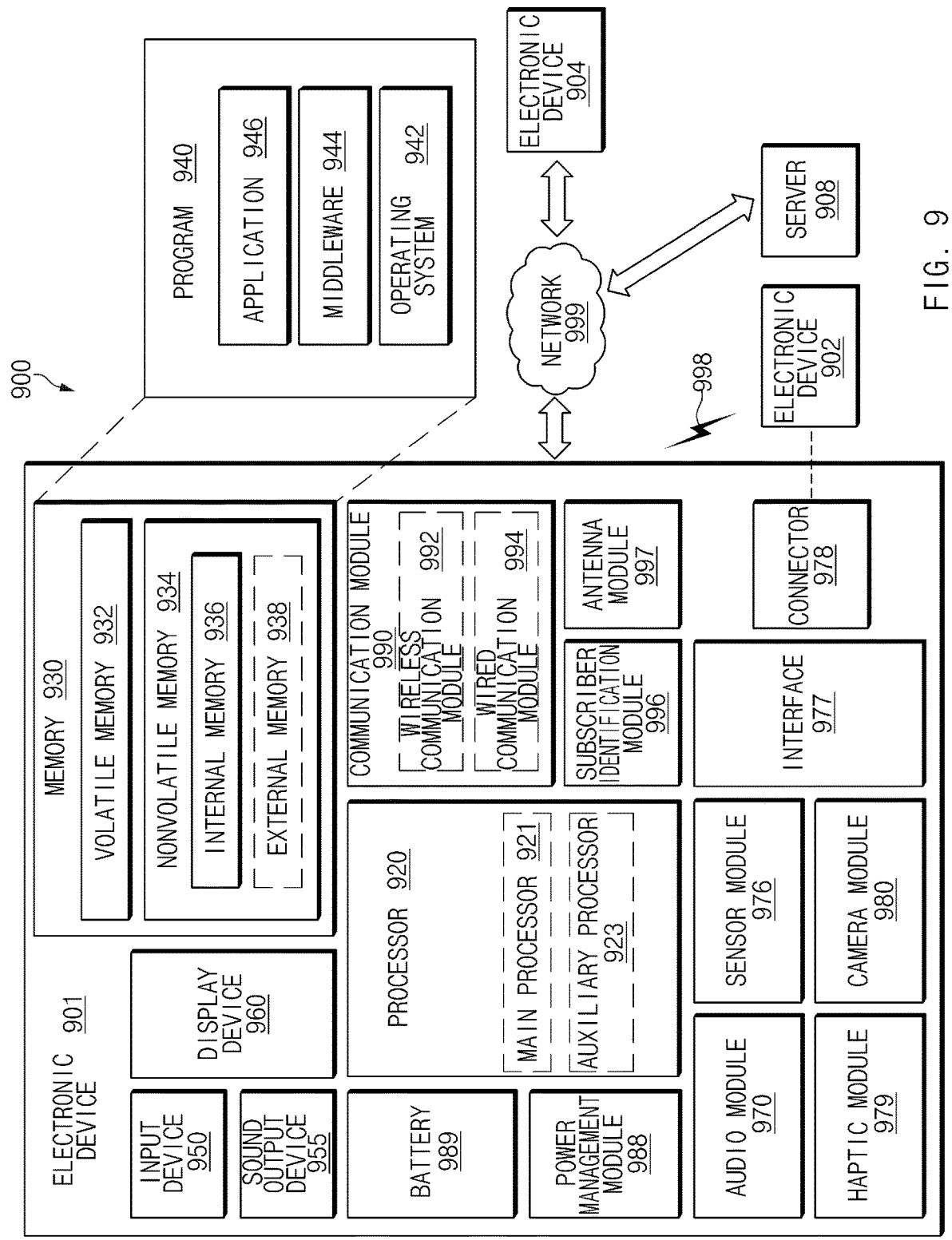
FIG. 9 is a block diagram of an electronic device in a network environment system according to certain example embodiments.

FIG. 9 is a block diagram illustrating an electronic device 901 (e.g., the electronic device 100 of FIG. 2) in a network environment 900 according to certain embodiments. Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920 (e.g., the processor 150 of FIG. 2), memory 930 (e.g., the memory 140 of FIG. 2), an input device 950, a sound output device 955, a display device 960 (e.g., the display 130 of FIG. 2), an audio module 970, a sensor module 976 (e.g., the sensor circuit 120 of FIG. 2), an interface 977, a haptic module 979, a camera module 980 (e.g., the camera 110 of FIG. 2), a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to an embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector), The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to an embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include one or more antennas, and, therefrom, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The electronic device according to the embodiments disclosed in the disclosure may automatically switch from the preview mode to the panorama capture mode based on the movement of the electronic device, thereby allowing a user to conveniently use the panorama capture mode. In addition, various effects that are directly or indirectly understood through the disclosure may be provided.

While the disclosure has been shown and described with reference to certain embodiments thereof, it will be understood by those skilled in the art that various changes in form and details may be made therein without departing from the disclosure as defined by the appended claims and their equivalents.

What is claimed is:

1. An electronic device comprising:
a display;
a camera arranged on one surface of the electronic device;
a sensor circuit configured to sense movement of the electronic device;
a processor functionally coupled to the camera and the sensor circuit; and
a memory electrically coupled to the processor,
wherein the memory stores instructions that, when executed, cause the processor to:
execute a preview mode including outputting an image obtained using the camera to the display,
obtain movement information using the sensor circuit while executing the preview mode and identify a velocity of the movement of the electronic device based on the movement information;
determine whether a movement distance of the electronic device is equal to or greater than a prespecified reference distance, based on the movement information while executing the preview mode;
when the movement distance is equal to or greater than the prespecified reference distance, determine whether a moving direction of the electronic device matches a prespecified reference direction based on the movement information while executing the preview mode;
in the preview mode, store first images in the memory, the first images obtained using the camera while tracking the movement distance;
when the moving direction of the electronic device matches the prespecified reference direction and when the velocity of the electronic device is less than a prespecified velocity, switch from the preview mode to a panorama capture mode, and
in the panorama capture mode, store second images obtained using the camera in the memory; and
generate a panoramic image based on the first images and the second images stored in the memory.

2. The electronic device of claim 1, wherein the reference direction includes at least one of a leftwards direction, a rightwards direction, an upwards direction, and a downwards direction of the electronic device.

3. The electronic device of claim 1, wherein the instructions further cause the processor to:
detect a change in an angle of the electronic device during the movement based on the movement information; and
switch from the preview mode to the panorama capture mode when the moving direction of the electronic device matches the prespecified reference direction, and the change in the angle is disposed within a prespecified reference range of angle changes.

4. The electronic device of claim 3, wherein an x axis represents a horizontal plane of the electronic device, a y axis represents a vertical plane of the electronic device, and a z axis represents a depthward plane of the electronic device, and
wherein the change in the angle corresponds to one of a change in the x and y axes, a change in the y and z axes, and a change in the z and x axes.

5. The electronic device of claim 1, wherein the instructions further cause the processor to:
after switching to the panorama capture mode, while the electronic device continues moving, detect from the movement information that the velocity exceeds the prespecified velocity; and
in response detecting that the velocity exceeds the prespecified velocity, terminate the panorama capture mode.

6. The electronic device of claim 1, wherein the instructions further cause the processor to:
switch to the panorama capture mode when the movement distance of the electronic device is equal to or greater than the prespecified reference distance, the moving direction of the electronic device matches the prespecified reference direction, and a location of the electronic device is within a predetermined range of a direction perpendicular to the reference direction.

7. The electronic device of claim 1, wherein the instructions further cause the processor to:
delete the first images from the memory when the movement distance is less than the prespecified reference distance, or the direction of the movement is different from the prespecified reference direction.

8. The electronic device of claim 1, wherein the instructions further cause the processor to:
output screen information including a first menu from which one or more images from among a plurality of images are specifiable; and
generate the panoramic image based on the one or more images specified through the first menu.

9. The electronic device of claim 1, wherein the instructions further cause the processor to:
identify an object included in a plurality of images, wherein, in addition to the moving direction, switching to the panorama capture mode is further based on whether the movement distance of the electronic device is equal to or greater than the prespecified reference distance, and whether the identified object matches a prespecified object.

10. The electronic device of claim 1, wherein the instructions further cause the processor to:
display a guide object selectable to switch to the panorama capture mode when the movement distance of the electronic device is equal to or greater than the prespecified reference distance, and the moving direction of the electronic device is the prespecified reference direction; and
switch to the panorama capture mode when the electronic device moves a second prespecified reference distance in the reference direction.

11. The electronic device of claim 1, wherein the instructions further cause the processor to:
output, to the display, screen information including a second menu selectable to switch to the panorama capture mode when the movement distance of the electronic device is equal to or greater than the prespecified reference distance, and the moving direction of the electronic device is the prespecified reference direction; and
switch to the panorama capture mode in response to detecting a user input to the second menu requesting a switch to the panorama capture mode.

12. A method of an electronic device, comprising:
when detecting a movement of the electronic device, obtaining movement information using a sensor circuit while executing a preview mode, the preview mode including outputting an image obtained using a camera to a display,
tracking a movement distance of the electronic device based on the movement information while executing the preview mode and identifying a velocity of the movement of the electronic device based on the movement information;
when the movement distance of the electronic device is equal to or greater than a prespecified reference distance, determining whether a moving direction of the electronic device matches a prespecified reference direction during the movement based on the movement information while executing the preview mode;
in the preview mode, storing first images in a memory, the first images obtained using the camera while tracking the movement distance;
when the moving direction of the electronic device matches the prespecified reference direction and when the velocity of the electronic device is less than a prespecified velocity, switching from the preview mode to a panorama capture mode,
in the panorama capture mode, storing second images obtained using the camera in the memory; and
generating a panoramic image based on the first images and the second images stored in the memory.

13. The method of claim 12, wherein the reference direction includes at least one of a leftwards direction, a rightwards direction, an upwards direction, and a downwards direction of the electronic device.

14. The method of claim 12, further comprising:
after switching to the panorama capture mode, while the electronic device continues moving, detecting from the movement information that the velocity exceeds the prespecified velocity; and
in response detecting that the velocity exceeds the prespecified velocity, terminating the panorama capture mode.

15. The method of claim 14, wherein an x axis represents a horizontal plane of the electronic device, a y axis represents a vertical plane of the electronic device, and a z axis represents a depthward plane of the electronic device, and
wherein the change in the angle corresponds to one of a change in the x and y axes, a change in the y and z axes, and a change in the z and x axes.

16. The method of claim 12, further comprising:
outputting screen information including a first menu from which one or more images from among a plurality of images are specifiable; and
generating the panoramic image based on the one or more images specified through the first menu.

17. The method of claim 12, further comprising:
identifying a velocity of the movement of the electronic device based on the movement information,
switching to the panorama capture mode when the movement distance of the electronic device is greater than or equal to the prespecified reference distance, the moving direction of the electronic device matches the prespecified reference direction, and the velocity of the electronic device is less than a prespecified velocity.

18. The method of claim 12, further comprising:
switching to the panorama capture mode when the movement distance of the electronic device is equal to or greater than the prespecified reference distance, the moving direction of the electronic device matches the prespecified reference direction, and a location of the electronic device is within a predetermined range of a direction perpendicular to the reference direction.

* * * * *